(12) United States Patent
Goo et al.

(10) Patent No.: US 9,787,975 B2
(45) Date of Patent: Oct. 10, 2017

(54) METHOD FOR DISPLAYING STEREOSCOPIC IMAGE AND DISPLAY APPARATUS FOR PERFORMING THE SAME

(75) Inventors: Nam-Hee Goo, Asan-si (KR); Byoung-Jun Lee, Cheonan-si (KR); Yun-Jae Kim, Asan-si (KR); Myoung-Chul Kim, Dongducheon-si (KR); Jae-Ho Choi, Seongnam-si (KR); Bo-Ram Kim, Asan-si (KR); Ji-Woong Kim, Jeonju-si (KR); Jong-Yoon Lee, Ansan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 916 days.

(21) Appl. No.: 13/240,240

(22) Filed: Sep. 22, 2011

(65) Prior Publication Data
US 2012/0113169 A1     May 10, 2012

(30) Foreign Application Priority Data

Nov. 5, 2010    (KR) .......................... 10-2010-0109838
May 18, 2011    (KR) .......................... 10-2011-0046764

(51) Int. Cl.
*G09G 5/10*          (2006.01)
*H04N 13/04*        (2006.01)
(Continued)

(52) U.S. Cl.
CPC ......... *H04N 13/0438* (2013.01); *G09G 3/003* (2013.01); *G09G 3/342* (2013.01);
(Continued)

(58) Field of Classification Search
None
See application file for complete search history.

(56) References Cited

U.S. PATENT DOCUMENTS 5,710,592 A *   1/1998   Oh .................... H04N 13/0497
                                                                348/56
6,448,952 B1     9/2002   Toyoda et al.
(Continued)

FOREIGN PATENT DOCUMENTS

| CN | 101878654 | 11/2010 |
|---|---|---|
| JP | 09-051552 | 2/1997 |

(Continued)

OTHER PUBLICATIONS

English Abstract for Publication No. 2002-101427.
(Continued)

*Primary Examiner* — Ilana Spar
*Assistant Examiner* — Kirk Hermann
(74) *Attorney, Agent, or Firm* — F.Chau & Associates, LLC

(57) ABSTRACT

A method of displaying a stereoscopic image includes outputting a left-eye image to a first and a second display block of a display panel during an N-th frame. Light is provided to the first display block during a first period of the N-th frame and light is provided to the second display block during a second period of the N-th frame. A right-eye image is output to the first and second display blocks of the display panel during an M-th frame. Light is provided to the first display block during a first period of the M-th frame and light is provided light to the second display block during a second period of the M-th frame.

35 Claims, 20 Drawing Sheets

(51) Int. Cl.
*G09G 3/00* (2006.01)
*G09G 3/34* (2006.01)
*G09G 3/36* (2006.01)

(52) U.S. Cl.
CPC ....... *G09G 3/3648* (2013.01); *H04N 13/0497* (2013.01); *G09G 2310/024* (2013.01); *H04N 2213/008* (2013.01)

(56) References Cited

U.S. PATENT DOCUMENTS

| | | | |
|---|---|---|---|
| 8,482,706 | B2 | 7/2013 | Jung et al. |
| 8,525,872 | B2 | 9/2013 | Choi et al. |
| 2008/0084519 | A1 | 4/2008 | Brigham et al. |
| 2008/0239176 | A1* | 10/2008 | Shestak et al. .............. 349/15 |
| 2008/0303963 | A1* | 12/2008 | Jung et al. .................. 349/13 |
| 2010/0020062 | A1 | 1/2010 | Liou et al. |
| 2010/0066820 | A1 | 3/2010 | Park et al. |
| 2010/0157032 | A1 | 6/2010 | Park et al. |
| 2010/0236274 | A1 | 9/2010 | Rother et al. |
| 2010/0238274 | A1* | 9/2010 | Kim et al. .................... 348/51 |
| 2010/0253678 | A1 | 10/2010 | Choi et al. |
| 2011/0018983 | A1* | 1/2011 | Kim ................. G02B 27/2264 348/56 |
| 2012/0206579 | A1* | 8/2012 | Wu ................... H04N 13/0438 348/51 |

FOREIGN PATENT DOCUMENTS

| | | | |
|---|---|---|---|
| JP | 09051552 A | * | 2/1997 |
| JP | 2002-101427 | | 4/2002 |
| JP | 2007-256560 | | 10/2007 |
| JP | 2010-156972 | | 7/2010 |
| JP | 2010-175797 | | 8/2010 |
| KR | 10-2008-0107239 | | 12/2008 |
| KR | 1020080105873 | * | 12/2008 |
| KR | 10-2010-0111082 | | 10/2010 |
| WO | WO 2009/069026 A2 | | 6/2009 |
| WO | WO 2009069026 A2 | * | 6/2009 |
| WO | WO 2010/107227 A2 | | 9/2010 |
| WO | WO 2012057757 A1 | * | 5/2012 ........... G02F 1/1336 |

OTHER PUBLICATIONS

European Search Report dated Jul. 15, 2014.
Japanese Office Action dated Sep. 29, 2015.
Korean Office Action dated June 3, 2016.

* cited by examiner

METHOD FOR DISPLAYING STEREOSCOPIC IMAGE AND DISPLAY APPARATUS FOR PERFORMING THE SAME

CROSS-REFERENCE TO RELATED APPLICATIONS

This application claims priority under 35 U.S.C. §119 to Korean Patent Application No. 2010-109838, filed on Nov. 5, 2010 and to Korean Patent Application No. 2011-0046764 filed on May 18, 2011 in the Korean Intellectual Property Office (KIPO), the contents of which are herein incorporated by reference in their entireties.

BACKGROUND

1. Technical Field

The present invention relates to stereoscopic imagery and more particularly, to a method for displaying a stereoscopic image and a display apparatus for performing the method.

2. Discussion of the Related Art

Generally, a display apparatus displays two-dimensional images (hereinafter referred to as 2D images). Recently, according to increasing demand for the display of three-dimensional images (hereinafter referred to as 3D images) in fields of games, movies and so on, display apparatuses for displaying 3D images have been developed.

A 3D image display apparatus displays a 3D image by using binocular parallax, which is the process of directing two distinct images to the left and right eyes of the observer. By directing a left-eye image to the left eye of the observer and a right-eye image to the right eye of the observer, the observer is able to perceive a sense of depth.

The 3D image display apparatus using the binocular parallax may be characterized as either a stereoscopic-type display apparatus or an auto-stereoscopic-type display apparatus according to whether specific glasses are necessary to properly view the 3D display device. The stereoscopic-type display apparatus may be characterized as either a passive polarized glasses-type display apparatus, an active shutter glasses-type display apparatus, etc. In the passive polarized-type display apparatus, a pair of glasses having different polarizing axes is used by a user. In the active shutter glasses-type display apparatus, display of a left-eye image and a right-eye image are alternated, and a pair of glasses in which a left-eye shutter and a right-eye shutter are closed and opened in synchronous with the alternating display is used. According to the active shutter glasses-type display apparatus, the left-eye shutter or the right-eye shutter is opened during a vertical blanking interval after the left-eye image or the right-eye image is displayed on a display panel, and then the left-eye image or the right-eye image may be viewed by the observer.

Many LCD display devices are capable of displaying image frames at a rate of 60 image frames per second (60 Hz). Thus, the left-eye and right-eye images are respectively provided at a frequency of approximately 30 Hz when a 3D stereoscopic image is displayed through a conventional LCD device. At such a display frequency, the observer may become aware of a change process from the left-eye image into the right-eye image or a change process from the right-eye image into the left-eye image. Other LCD display devices are capable of displaying 120 image frames per second (120 Hz). In such high-driving frequency devices, left-eye and right-eye images are respectively provided at a frequency of approximately 60 Hz when a 3D stereoscopic image is displayed. Accordingly, the left-eye image and the right-eye image co-exist and crosstalk in which the left-eye image influences what is seen by the right eye, and vice versa, may be generated.

Since the LCD apparatus is driven using a progressive scan method, points of time for applying a line data to a plurality of horizontal lines of the LCD apparatus are different from each other and liquid crystal responses for a same point of a time are different from each other. Thus, when a 3D image is displayed on a screen of the LCD apparatus by alternately displaying a left-eye image and a right-eye image, crosstalk is generated due to a gradation difference between the left-eye image and the right-eye image and a display timing of the left-eye image and the right-eye image in accordance with the progressive scan method. Particularly, since a response speed is slow from an upper portion of the display panel to a lower portion of the display panel, crosstalk may be generated at the lower portion of the display panel rather than the upper portion of the display panel. Accordingly, a display quality of the stereoscopic image may be decreased due to crosstalk.

SUMMARY

Exemplary embodiments of the present invention provide a method of displaying a stereoscopic image capable of reducing or preventing crosstalk of the stereoscopic image.

Exemplary embodiments of the present invention also provide a display apparatus for performing the above-mentioned method.

According to one aspect of the present invention, there is provided a method for displaying a stereoscopic image. In the method, a left-eye image is outputted to a display panel divided into k display blocks (wherein 'k' is an integer greater than or equal to two) during an N-th frame ('N' is a positive integer). Then, backlighting is provided to each of the display blocks at a time that first to k-th left-eye preset times respectively corresponding to the k display blocks are elapsed from a time in which corresponding left-eye images are outputted to each of the display blocks. Then, a right-eye image is outputted to the display panel during an M-th frame ('M' is a positive integer greater than N). Then, backlighting is provided to each of the display blocks at a time that first to k-th right-eye preset times respectively corresponding to the k display blocks are elapsed from a time in which corresponding right-eye images are outputted to each of the display blocks.

In an exemplary embodiment, opening and closing times of a left-eye shutter and a right-eye shutter of a pair of shutter glasses may be further adjusted, corresponding to the left-eye image or the right-eye image that are displayed on each of the display blocks.

In an exemplary embodiment, the left-eye shutter may be opened and the right-eye shutter may be closed while backlighting is provided to the k display blocks displaying the left-eye image. The right-eye shutter may be opened and the left-eye shutter may be closed while backlighting is provided to the k display blocks displaying the right-eye image.

In an exemplary embodiment, the left-eye image and the right-eye image may be displayed on the display panel in a frame frequency of approximately 60 Hz or a multiple thereof.

In an exemplary embodiment, at least one of the first to k-th left-eye preset times and the first to k-th right-eye preset times may be set based on a response speed of a liquid crystal included in the display panel.

In an exemplary embodiment, at least one of the first to k-th left-eye preset times and the first to k-th right-eye preset times may be greater than or equal to a time required to achieve a luminance corresponding to approximately 60% of a luminance when the liquid crystal is saturated.

In an exemplary embodiment, the preset times that are preset correspond to each of the display blocks may be substantially equal to each other.

In an exemplary embodiment, a time in which light is provided to each of the display blocks may be substantially smaller than or equal to a time that preset times that are preset corresponding to each of the display blocks are subtracted from periods of the N-th and M-th frames, respectively.

In an exemplary embodiment, the left-eye image and the right-eye image may be outputted in accordance with a vertical synchronization signal capable of including an active interval and a blanking interval, and a time for providing backlight may be increased when the blanking interval is increased.

According to an aspect of the present invention, a display apparatus includes a light source part, a display panel and a light source driving part. The light source part includes k light-emitting blocks ('k' is a positive integer) to output light. The display panel is divided into k display blocks corresponding to the k light-emitting blocks to periodically display a left-eye image and a right-eye image. The light source driving part is configured to output a left-eye image to a display panel divided into k display blocks ('k' is an integer greater or equal to two) during an N-th frame ('N' is a positive integer). The light source driving part is configured to provide light to each of the display blocks at a time that first to k-th left-eye preset times respectively corresponding to the k display blocks are elapsed from a time in which corresponding left-eye images are outputted to each of the display blocks. The light source driving part is configured to output a right-eye image to the display panel during an M-th frame ('M' is a positive integer greater than N). The light source driving part is configured to provide light to each of the display blocks at a time that first to k-th right-eye preset times respectively corresponding to the k display blocks are elapsed from a time in which corresponding right-eye images are outputted to each of the display blocks.

In an exemplary embodiment, the display apparatus may further include a pair of shutter glasses. The shutter glasses may include a left-eye shutter and a right-eye shutter. The shutter glasses may selectively open and close the left-eye shutter and the right-eye shutter in accordance with an image displayed on the display panel.

In an exemplary embodiment, the shutter glasses may open the left-eye shutter and may close the right-eye shutter, while the light is provided to the k display blocks on which the left-eye image is displayed. The shutter glasses may open the right-eye shutter and may close the left-eye shutter, while the light is provided to the k display blocks on which the right-eye image is displayed.

In an exemplary embodiment, the display panel may display the left-eye image and the right-eye image at a frame frequency of approximately 60 Hz or a multiple thereof.

In an exemplary embodiment, at least one of the first to k-th left-eye preset times and the first to k-th right-eye preset times may be set based on a response speed of a liquid crystal included in the display panel.

In an exemplary embodiment, at least one of the first to k-th left-eye preset times and the first to k-th right-eye preset times may be greater than or equal to a time required to achieve a luminance corresponding to approximately 60% of a luminance when the liquid crystal is saturated.

In an exemplary embodiment, the display apparatus may further include a timing control part and a panel driving part. The timing control part controls driving timings of the k light-emitting blocks and driving times of the shutter glasses based on the left-eye image and the right-eye image that are displayed on the display panel. The panel driving part drives the display panel in accordance with a control of the timing control part.

In an exemplary embodiment, the light source driving part may set a time required for providing each of the display blocks with light, which is substantially smaller than or equal to a time that preset times corresponding to each of the display blocks are subtracted from each of periods of the N-th and M-th frames.

In an exemplary embodiment, each of the k light-emitting blocks may include at least one light source. The light source may be a line light source or a point light source.

In an exemplary embodiment, the display apparatus may further include a light-guide plate disposed below at a side of the light source part to guide light emitted from the light source part onto the display panel.

In an exemplary embodiment, the light source part may be disposed below the display panel.

According to an aspect of the present invention, there is provided a method for displaying a stereoscopic image. In the method, data corresponding to a left-eye image or a right-eye image are outputted to a display panel in which first to k-th ('k' is a positive integer) display blocks are defined by first to k-th light-emitting blocks. The light-emitting blocks are arranged along a scan direction that an image is displayed along. Then, the first to k-th light-emitting blocks are turned off during all off interval of one frame period. Then the first to k-th light-emitting blocks are sequentially turned on during a sequential on interval after the all off interval of the frame period. Then, opening and closing operation of a left-eye shutter and a right-eye shutter included in a shutter glasses is started in synchronous with the left-eye image or the right-eye image displayed on the display panel within the all off interval.

In an exemplary embodiment, in sequentially turning on the first to k-th light-emitting blocks, at least one of the first to k-th light-emitting blocks may have an overlap interval at least partially overlapping a light-emitting interval of a previous light-emitting block.

In an exemplary embodiment, in sequentially turning on the first to k-th light-emitting blocks, at least one of the first to k-th light-emitting blocks may have a light-emitting interval spaced apart from a light-emitting interval of a previous light-emitting block. The length of time between the light-emitting intervals of proximate light-emitting blocks may be predetermined and may differ from other such intervals.

In an exemplary embodiment, a first light-emitting block of the first to k-th light-emitting blocks may emit light during a first light-emitting interval after a predetermined set time from a time that a first line data of a first display block is outputted.

In an exemplary embodiment, starting opening and closing operation of a left-eye shutter and a right-eye shutter may include opening one of the left-eye shutter and the right-eye shutter corresponding to an image displayed on the display panel, and closing another of the left-eye shutter and the right-eye shutter.

According to a method for displaying a stereoscopic image according to an exemplary embodiment of the present invention and a display apparatus for performing the method, a light source part providing light to a display panel is divided into a plurality of light-emitting blocks so that each left-eye image and right-eye image is divided according to a time to be viewed, and a light-emitting timing of the light-emitting blocks is controlled so that the left-eye image or the right-eye image is displayed on the display panel. Thus, crosstalk may be reduced or prevented from being generated due to a co-existence of the left-eye image and the right-eye image.

Moreover, light-emitting intervals of each of the light-emitting blocks are individually controlled based on a light-emitting interval of adjacent light-emitting blocks. The time for opening and closing each shutter of the shutter glasses may be determined to reduce or eliminate crosstalk between the left-eye and right-eye images of the 3D image. In addition, luminance uniformity may be increased by reducing or eliminating leakage of light generated at adjacent light-emitting blocks so that light generated by one light-emitting block does not leak to an adjacent block.

BRIEF DESCRIPTION OF THE DRAWINGS

The above and other features and aspects of exemplary embodiments of the present invention are described in detailed below with reference to the accompanying drawings, in which.

DETAILED DESCRIPTION

Hereinafter, exemplary embodiments of the present invention are explained in detail below with reference to the accompanying drawings.

Figure 1:
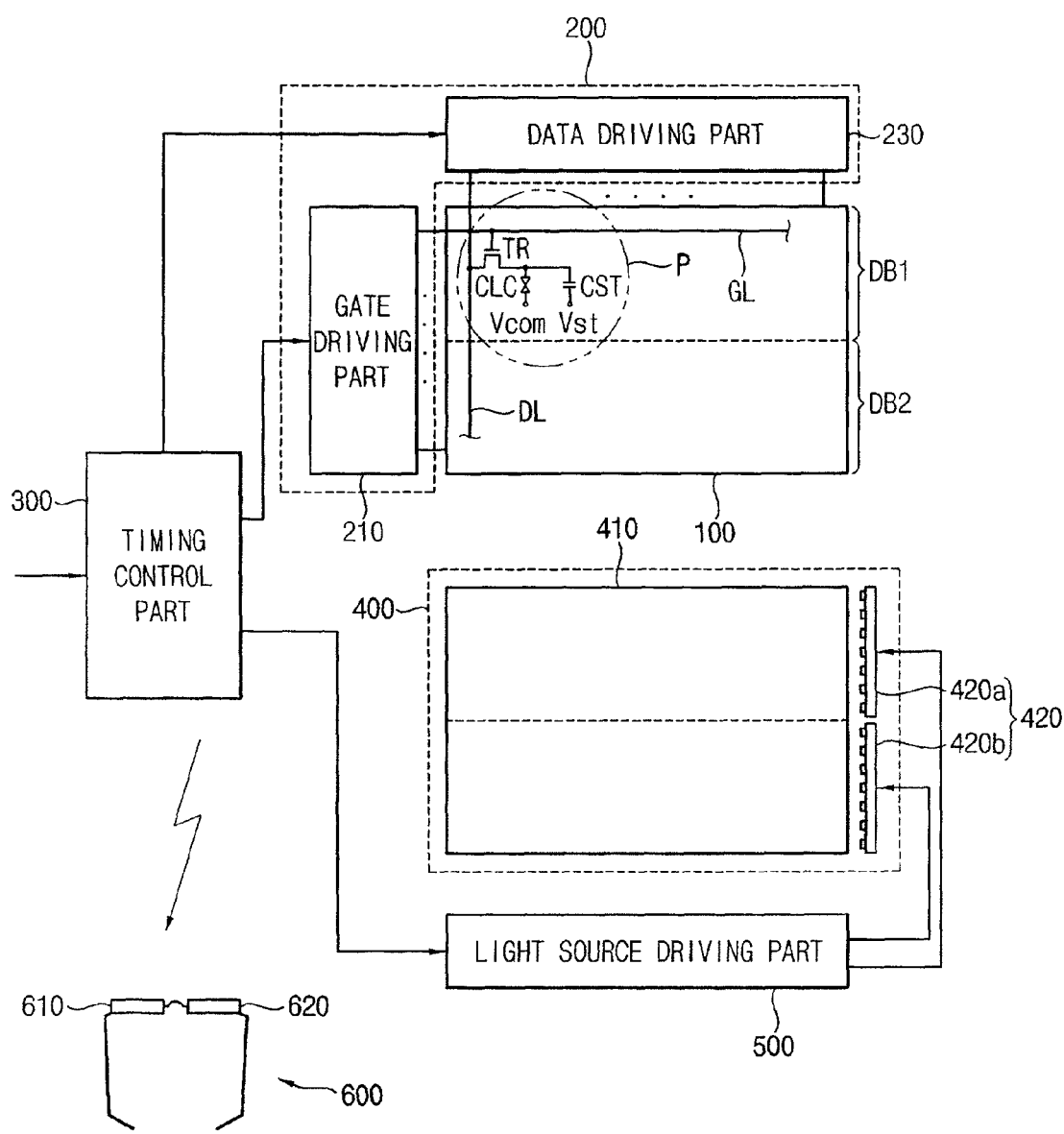
FIG. 1 is a block diagram illustrating a display apparatus according to an exemplary embodiment of the present invention.

FIG. 1 is a block diagram illustrating a display apparatus according to an exemplary embodiment of the present invention.

Referring to FIG. 1, the display apparatus includes a display panel 100, a panel driving part 200, a timing control part 300, a light providing unit 400 and a light source driving part 500. The display apparatus may further include a pair of shutter glasses 600.

The display panel 100 includes a plurality of pixels P which display an image. For example, each of the pixels includes a switching element TR electrically connected to a gate line GL and a data line DL, a liquid crystal capacitor CLC connected to the switching element TR and a storage capacitor CST connected to the switching element TR. The display panel 100 may include two substrates opposite to each other and a liquid crystal layer interposed between the two substrates.

The panel driving part 200 may include a gate driving part 210 and a data driving part 230. The gate driving part 210 generates a gate signal for activating the gate line GL to provide the gate line GL with the gate signal. The data driving part 230 converts an image signal received from the timing control part 300 into a data voltage. The data driving part 230 provides the data line DL with the data voltage.

The timing control part 300 controls a driving timing of the display apparatus based on a synchronizing signal received from an external device (not shown). For example, the timing control part 300 receives a 3D image signal from an external device to provide the data driving part 230 with the 3D image signal. For example, the timing control part 300 generates a 3D image signal to provide the data driving part 230 with the 3D image signal. The 3D image signal may include a left-eye image and a right-eye image. The timing control part 300 controls a driving of the light source driving part 500 based on an image displayed on the display panel 100. Moreover, the timing control part 300 may control a driving of the shutter glasses 600 based on an image displayed on the display panel 100.

The light providing unit 400 may include a light guide plate 410 and a light source part 420.

The light guide plate 410 may be disposed at a first side surface of the light source part 420 to provide the display panel 100 with light provided from the light source part 420.

The light source part 420 provides the display panel 100 with light. The light source part 420 includes a first light-emitting block 420a and a second light-emitting block 420b. The first and second light-emitting blocks 420a and 420b include at least one light source (not shown). The light source may be a fluorescent lamp or a light-emitting diode. The display panel 100 may be divided into a first display block DB1 and a second display block DB2 corresponding to the first and second light-emitting blocks 420a and 420b, respectively. The first light-emitting block 420a provides the first display block DB1 with light and the second light-emitting block 420b provides the second display block DB2 with light.

Although not shown in FIG. 1, the light source part 420 may further include a third light-emitting block opposite to the first light-emitting block 420a and a fourth light-emitting block opposite to the second light-emitting block 420b. In this case, the first light-emitting block 420a and the third light-emitting block may be synchronized with each other. Moreover, the second light-emitting block 420b and the fourth light-emitting block may be synchronized with each other.

The light providing unit 400 may further include a light-blocking member (not shown). The light-blocking member may be disposed between the first and second light-emitting blocks 420a and 420b. The light-blocking member may reduce or block light leaked from the first light-emitting block 420a to the second light-emitting block 420b and/or may reduce or block light leaked from the second light-emitting block 420b to the first light-emitting block 420a.

The light source driving part 500 controls a driving of the first and second light-emitting blocks 420a and 420b. For example, the light source driving part 500 controls the second light-emitting block 420b when the first light-emitting block 420a is turned on so that the second light-emitting block 420b is turned off, and the light source driving part 500 controls the first light-emitting block 420a when the second light-emitting block 420b is turned on so that the first light-emitting block 420a is turned off. The light source driving part 500 controls the first light-emitting block 420a at a time that a first left-eye preset time is elapsed from a time in which a first left-eye image is outputted to the first display block DB1, so that the first light-emitting block 420a is turned on. The light source driving part 500 controls the second light-emitting block 420b at a time that a second left-eye preset time is elapsed from a time in which a second left-eye image is outputted to the second display block DB2, so that the second light-emitting block 420b is turned on. The first left-eye preset time and the second left-eye preset time may be substantially equal to each other. The first and second left-eye preset times may be set based on a response speed of the liquid crystal. For example, the first and second left-eye preset times may be greater than or equal to a time required to achieve a luminance corresponding to approximately 60% of a luminance when the liquid crystal is saturated. The light source driving part 500 controls the first light-emitting block 420a at a time that a first right-eye preset time is elapsed from a point of time when an output of a first right-eye image is completed, so that the first light-emitting block 420a is turned on. The light source driving part 500 controls the second light-emitting block 420b at a time that a second right-eye preset time is elapsed from a point of time when an output of a second right-eye image is completed, so that the second light-emitting block 420b is turned on. The first right-eye preset time and the second right-eye preset time may be substantially equal to each other. The first left-eye preset time and the first right-eye preset time may be substantially equal to each other. The second left-eye preset time and the second right-eye preset time may be substantially equal to each other. The first and second left-eye preset times and the first and second right-eye preset times may be substantially equal to each other.

The shutter glasses 600 include a left-eye shutter 610 and a right-eye shutter 620. The shutter glasses 600 may selectively open and close the left-eye shutter 610 and the right-eye shutter 620 in response to a shutter control signal received from the timing control part 300 and so on. For example, the shutter glasses 600 open the left-eye shutter 610 and close the right-eye shutter 620, while light is provided to the first and second display blocks DB1 and DB2 corresponding to the first and second left-eye images. Alternatively, the shutter glasses 600 open the right-eye shutter 620 and close the left-eye shutter 610, while light is provided to the first and second display blocks DB1 and DB2 corresponding to the first and second right-eye images.

Figure 2:
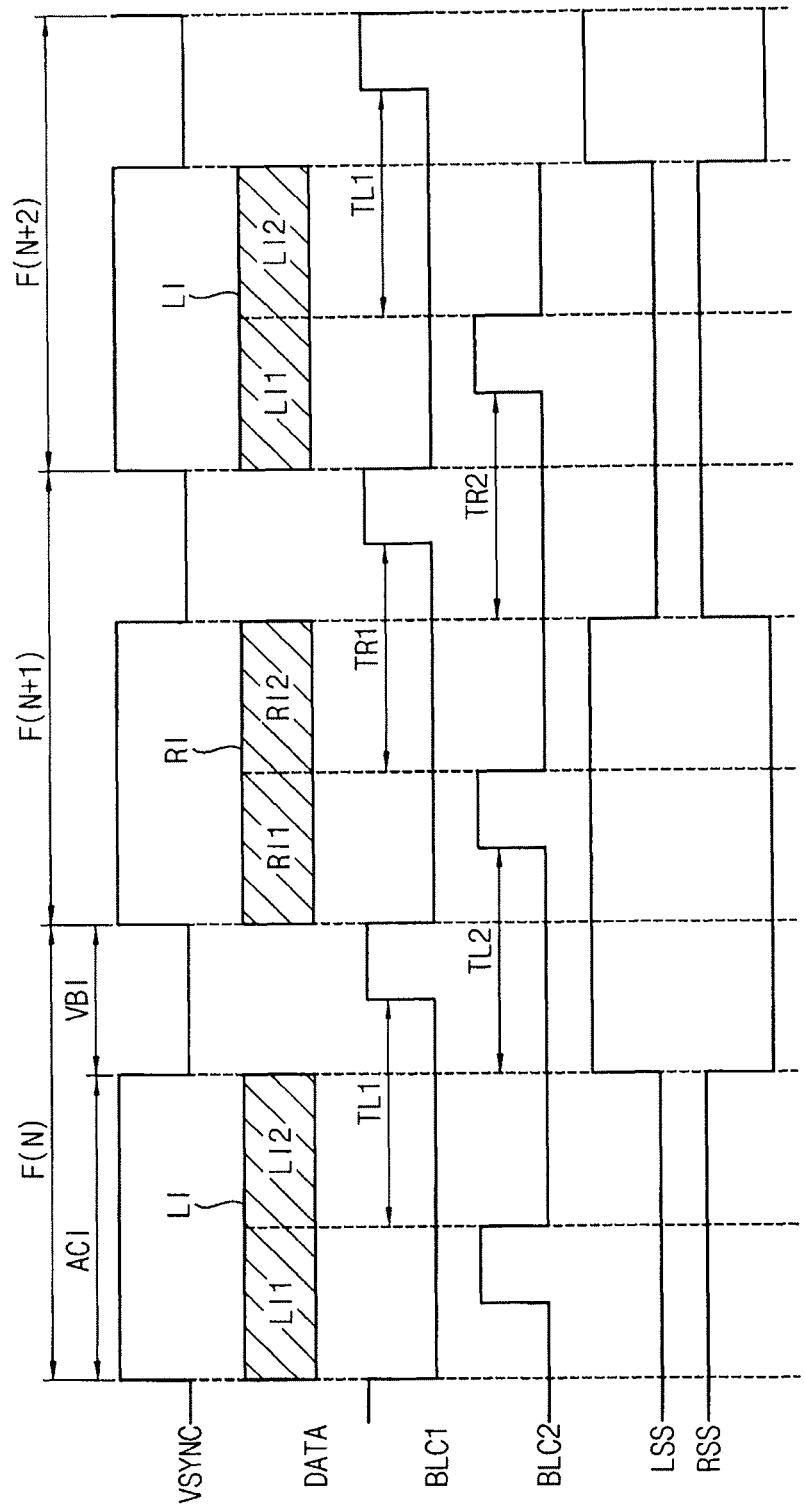
FIG. 2, FIG. 3 and FIG. 4 are timing diagrams illustrating a method for displaying a stereoscopic image by the display apparatus of FIG. 1.
Figure 3:
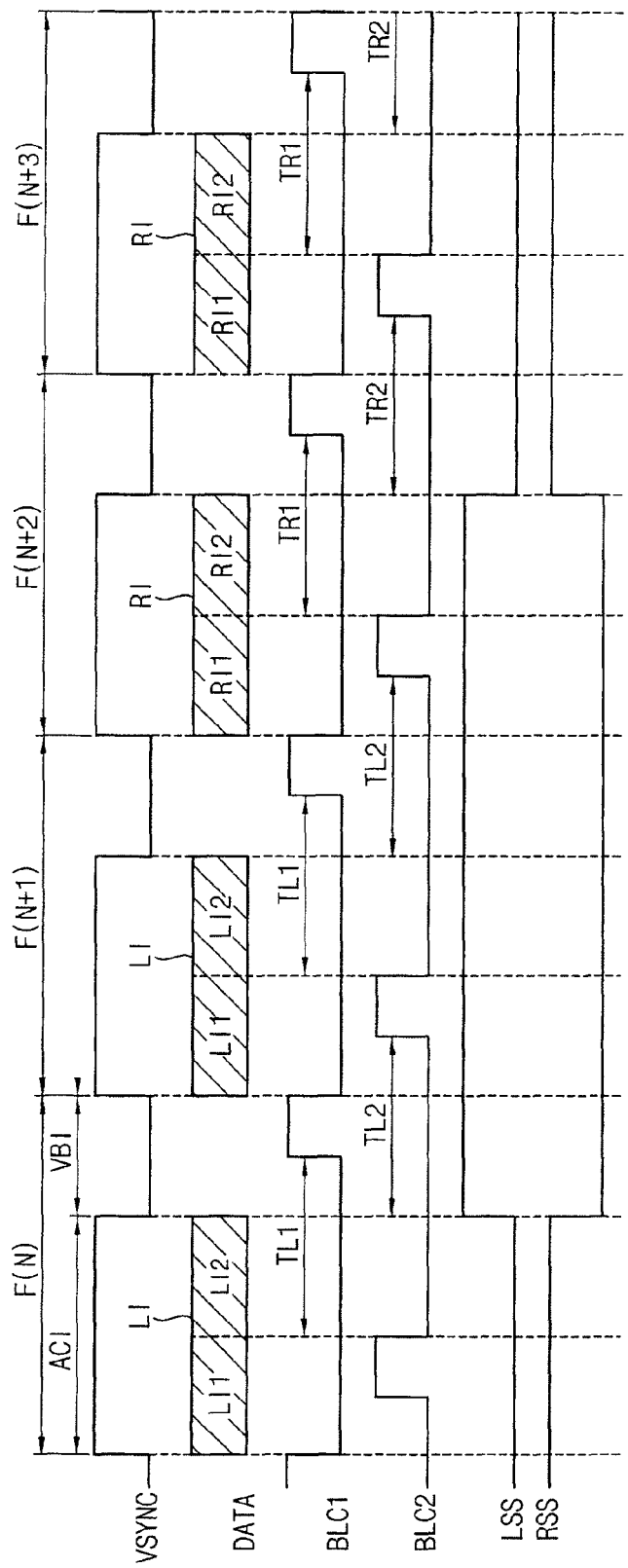
Figure 4:
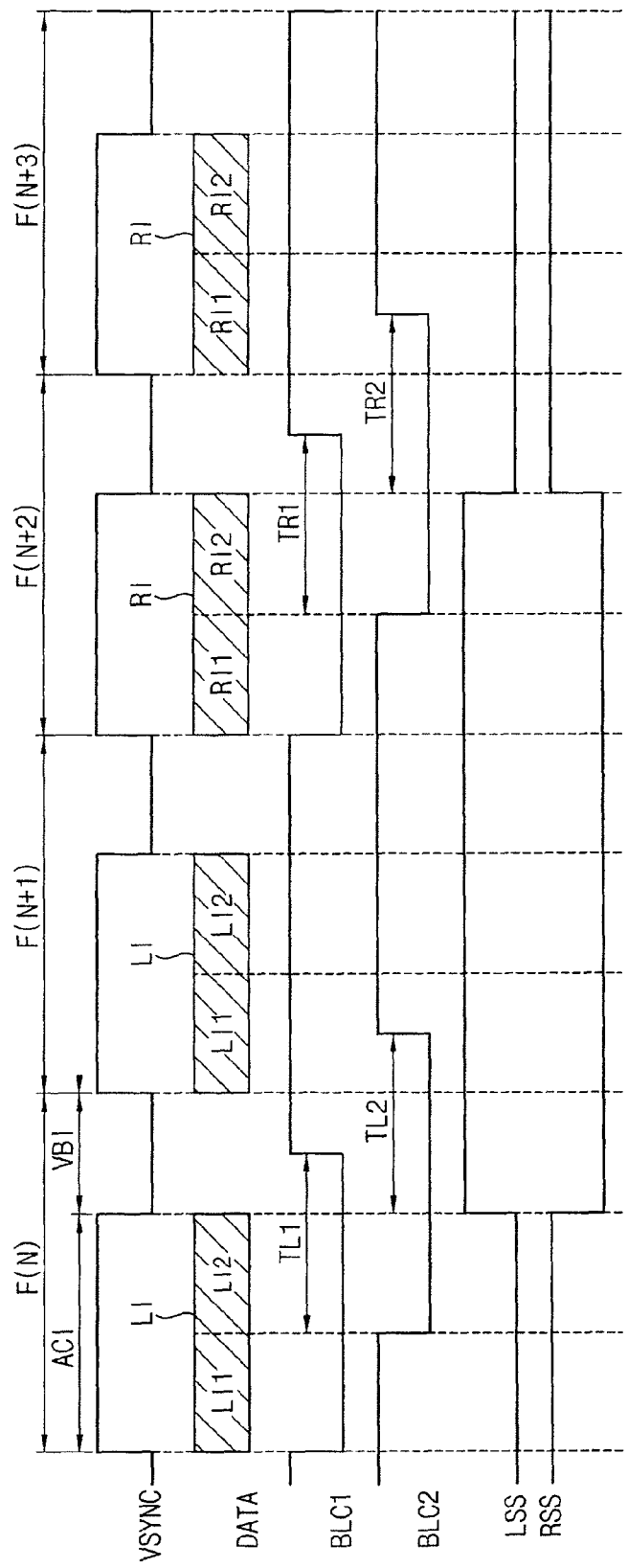

FIGS. 2, 3 and 4 are timing diagrams illustrating a method for displaying a stereoscopic image using the display apparatus of FIG. 1.

Referring to FIGS. 1 to 4, a left-eye image LI is outputted during an N-th frame F(N). In this case, 'N' is a positive integer. The left-eye image LI is outputted based on a vertical synchronization signal VSYNC. The N-th frame may include an active interval ACI and a blanking interval VBI. The left-eye image LI is outputted at the active interval ACI of the N-th frame, and may be maintained during the blanking interval VBI. The blanking interval VBI may be set to be less than approximately 10% of one conventional frame period. Alternatively, the blanking interval VBI may be set to be more than approximately 10% of one frame period. For example, the blanking interval VBI may be set to be greater than or equal to approximately 30% of one frame period.

The left-eye image LI may be divided into a first left-eye image LI1 displayed on the first display block DB1 of the display panel 100 and a second left-eye image LI2 displayed on the second display block DB2 of the display panel 100. For example, when the display panel 100 has a resolution of 1920×1080, each of the first and second display blocks DB1 and DB2 may have a resolution of 1920×540. In this case, the left-eye image LI may have 1920×1080 image data, and each of the first and second left-eye images LI1 and LI2 may have 1920×540 image data. The display panel 100 may display a frame image having a resolution of 1920×1080 at a frame frequency of approximately 60 Hz or a multiple thereof.

The light source driving part 500 drives the first light-emitting block 420a based on a first light-emitting control signal BLC1 and drives the second light-emitting block 420b based on a second light-emitting control signal BLC2. The first light-emitting control signal BLC1 and the second light-emitting control signal BLC2 may be transmitted by one wiring. Alternatively, each of the first and second light-emitting control signals BLC1 and BLC2 may be transmitted by different wirings. For example, the first light-emitting block 420a may be turned on in response to the first light-emitting control signal BLC1 of a high level and may be turned off in response to the first light-emitting control signal BLC1 of a low level. For example, the second light-emitting block 420b may be turned on in response to the second light-emitting control signal BLC2 of a high level and may be turned off in response to the second light-emitting control signal BLC2 of a low level. The first light-emitting block 420a may be turned on at a time that a first left-eye preset time TL1 is elapsed from a time in which the first left-eye image LI1 is outputted to the first display block DB1. The second light-emitting block 420b may be turned on at a time that a second left-eye preset time TL2 is elapsed from a time in which the second left-eye image LI2 is outputted to the second display block DB2. The first left-eye preset time TL1 or the second left-eye preset time TL2 may be set based on a response speed of a liquid crystal included in the display panel 100. For example, the first left-eye preset time TL1 or the second left-eye preset time TL2 may be greater than or equal to a time required to achieve a luminance corresponding to approximately 60% of a luminance when the liquid crystal is saturated. The first left-eye preset time TL1 or the second left-eye preset time TL2 may be set based on a time in which one frame period is divided by the first and second light-emitting blocks 420*a* and 420*b*. For example, the first left-eye preset time TL1 may be set to have a value greater than a time in which one frame period is divided by the first and second light-emitting blocks 420*a* and 420*b*. The shutter glasses 600 control opening/closing of the left-eye shutter 610 based on a first shutter control signal LSS, and control opening/closing the right-eye shutter 620 based on a second shutter control signal RSS. The shutter glasses 600 may open the left-eye shutter 610 in response to the first shutter control signal LSS of a high level, and may close the left-eye shutter 610 in response to the first shutter control signal LSS of a low level. Moreover, the shutter glasses 600 may open the right-eye shutter 620 in response to the second shutter control signal RSS of a high level and may close the right-eye shutter 620 in response to the second shutter control signal RSS of a low level. While the first and second light-emitting blocks 420*a* and 420*b* emit light, the shutter glasses 600 may open the left-eye shutter 610 and may close the right-eye shutter 620.

An observer may view the first left-eye image displayed on the first display block DB1 through the left-eye shutter 610 while the first light-emitting block 420*a* is turned on, and may view the second left-eye image displayed on the second display block DB2 through the left-eye shutter 610 while the second light-emitting block 420*b* is turned on.

Moreover, during an M-th frame F(M) (wherein, 'M' is a positive integer greater than 'N'), a right image RI is outputted to the display panel 100. A case in which M is N+1 as an example is described in FIG. 2, and a case in which M is greater than N+1 as an example is described in FIGS. 3 and 4. As shown in FIGS. 3 and 4, a left-eye image LI may be outputted to the display panel 100 during the N-th frame F(N), and may be outputted to the display panel 100 during an interval from an (N+1)-th frame F(N+1) to an (M−1)-th frame F(M−1) that is a previous frame of an M-th frame that the right-eye image RI is outputted to the display panel 100. The left-eye image LI outputted from an (N+1)-th frame F(N+1) to an (M−1)-th frame F(M−1) is substantially identical to the left-eye image LI outputted from an N-th frame F(N). Alternatively, the left-eye image LI may be an image generated based on the left-eye image LI of the N-th frame F(N). The left-eye image LI outputted from an (N+1)-th frame F(N+1) to an (M−1)-th frame F(M−1) may be an image corresponding to a black grayscale. A right-eye image RI may be outputted to the display panel 100 during the M-th frame F(M), and may be outputted to the display panel 100 during an interval from an (M+1)-th frame F(M+1) to an (2M−N−1)-th frame F(2M−N−1) that is a previous frame of an (2M-N)-th frame that the left-eye image LI is outputted to the display panel 100. The right-eye image RI outputted from an (M+1)-th frame F(M+1) to an (2M−N−1)-th frame F(2M−N−1) is substantially identical to the right-eye image RI of an M-th frame F(M). Alternatively, the right-eye image RI may be an image generated based on the right-eye image RI of the M-th frame F(M). The right-eye image RI may be an image corresponding to a black grayscale, which is outputted during an interval from an (M+1)-th frame F(M+1) to an (2M−N−1)-th frame F(2M−N−1).

Referring to FIGS. 2 to 4, the right-eye image RI may be output in the active interval ACI of the M-th frame, and may be maintained during the blanking interval VBI. The right-eye image RI may be divided into a first right-eye image RI1 displayed on the first display block DB1 of the display panel 100 and a second right-eye image RI2 displayed on the second display block DB2 of the display panel 100.

The first light-emitting block 420*a* may be turned on in response to the first light-emitting control signal BLC1 of a high level, and may be turned off in response to the first light-emitting control signal BLC1 of a low level. The first light-emitting block 420*a* is turned on at a time that a first right-eye preset time TR1 is elapsed from a time in which the first right-eye image RI1 is outputted to the first display block DB1. The second light-emitting block 420*b* may be turned on in response to the second light-emitting control signal BLC2 of a high level, and may be turned off in response to the second light-emitting control signal BLC2 of a low level. The second light-emitting block 420*b* is turned on at a time that a second right-eye preset time TR2 is elapsed from a time in which the second right-eye image RI2 is outputted to the second display block DB2. The first right-eye preset time TR1 or the second right-eye preset time TR2 may be set based on a response speed of a liquid crystal included in the display panel 100. For example, the first right-eye preset time TR1 or the second right-eye preset time TR2 may be greater than or equal to a time required to achieve a luminance corresponding to approximately 60% of a luminance when the liquid crystal is saturated. The first left-eye preset time TL1 and the first right-eye preset time TR1 may be substantially equal to each other. The second left-eye preset time TL2 and the second right-eye preset time TR2 may be substantially equal to each other. The first and second left-eye preset times TL1 and TL2 and the first and second right-eye preset times TR1 and TR2 may be substantially equal to each other. The first right-eye preset time TR1 or the second right-eye preset time TR2 may be set to have a value greater than a time in which one frame period is divided by the first and second light-emitting blocks 420*a* and 420*b*.

The shutter glasses 600 open the right-eye shutter 620 and close the left-eye shutter 610 while light generated from the first and second light-emitting blocks 420*a* and 420*b* are provided to the display panel 100 displaying the right-eye image RI. An emitting time of the first light-emitting block 420*a* is substantially smaller than or equal to a time that the first left-eye preset time TL1 or the first right-eye preset time TR1 is subtracted from one frame interval. An emitting time of the second light-emitting block 420*b* is substantially smaller than or equal to a time that the second left-eye preset time TL2 or the second right-eye preset time TR2 is subtracted from one frame interval.

An observer may view the first right-eye image displayed on the first display block DB1 through the right-eye shutter 620 while the first light-emitting block 420*a* is turned on and may view the second right-eye image displayed on the second display block DB2 through the right-eye shutter 620 while the second light-emitting block 420*b* is turned on.

According to an exemplary embodiment, the light source part 420 is divided into the first and second light-emitting blocks 420*a* and 420*b* so that each of the left-eye and right-eye images LI and RL is divided into two images. A light-emitting timing of the first and second light-emitting blocks 420*a* and 420*b* is controlled so that the left-eye image or the right-eye image is displayed on the display block of the display panel 100. Thus, the generation of crosstalk between the left-eye and right-eye images may be reduced or prevented.

Figure 5:
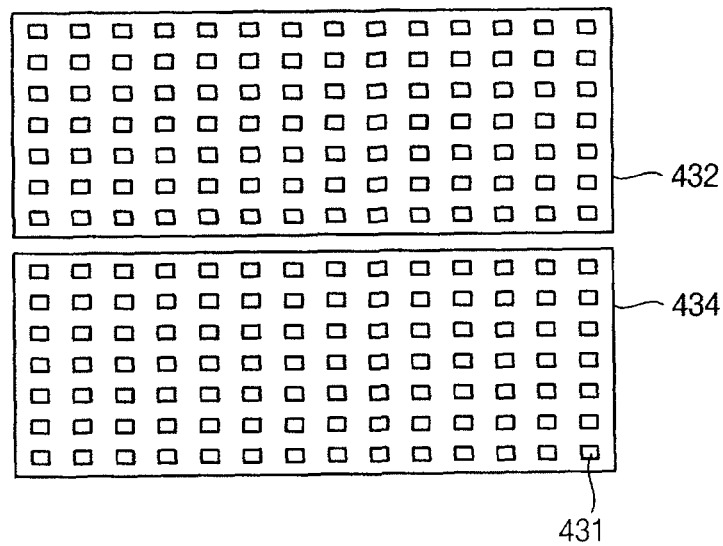
FIG. 5 is a plan view illustrating a light providing unit according to an exemplary embodiment of the present invention.

FIG. 5 is a plan view illustrating a light providing unit according to an exemplary embodiment of the present invention.

The display apparatus according to an exemplary embodiment may be substantially the same as the display apparatus discussed above with respect to FIG. 1 and may also include a light providing unit 401. Moreover, a method of displaying a stereoscopic image according to an exemplary embodiment may be substantially the same as the method of displaying a stereoscopic image described above with respect to FIGS. 2 to 4.

Referring to FIGS. 1 and 5, a light providing unit 401 according to an exemplary embodiment includes a first light-emitting block 432 and a second light-emitting block 434. Each of the first and second light-emitting blocks 432 and 434 includes a plurality of light sources 431. Each light source may be a light-emitting diode (LED). The first and second light-emitting blocks 432 and 434 are disposed below the display panel 100. Although not shown in FIGS. 1 and 5, the light providing unit 401 may further include a light-blocking member which is disposed between the first and second light-emitting blocks 432 and 434 and may prevent light from being leaked from the first light-emitting block 432 to the second light-emitting block 434 or from the second light-emitting block 434 to the first light-emitting block 432.

The first and second light-emitting blocks 432 and 434 are disposed below the display panel 100 and light generated from the first and second light-emitting blocks 432 and 434 is directed onto the display panel 100.

Figure 6:
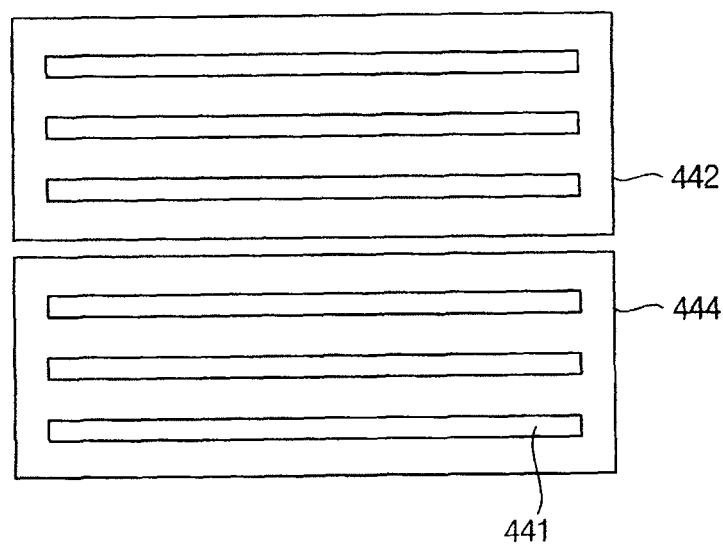
FIG. 6 is a plan view illustrating a light providing unit according to an exemplary embodiment of the present invention.

FIG. 6 is a plan view illustrating a light providing unit according to an exemplary embodiment of the present invention.

The display apparatus according to an exemplary embodiment may be substantially the same as the display apparatus described above with respect to FIG. 1 and may additionally include a light providing unit 402. Moreover, a method of displaying a stereoscopic image according to an exemplary embodiment may be substantially the same as the method of displaying a stereoscopic image described above with respect to FIGS. 2 to 4.

Referring to FIGS. 1 and 6, the light providing unit 402 includes a first light-emitting block 442 and a second light-emitting block 444. Each of the first and second light-emitting blocks 442 and 444 includes at least one light source 441. The light source 441 may be a fluorescent lamp. The first and second light-emitting blocks 442 and 444 are disposed below the display panel 100. Although not shown in FIGS. 1 and 6, the light providing unit 402 may further include a light-blocking member which is disposed between the first and second light-emitting blocks 442 and 444 and may prevent light from being leaked from the first light-emitting block 442 to the second light-emitting block 444 or from the second light-emitting block 444 to the first light-emitting block 442.

The first and second light-emitting blocks 442 and 444 are disposed below the display panel 100 and light generated from the first and second light-emitting blocks 442 and 444 is directed onto the display panel 100.

Figure 7:
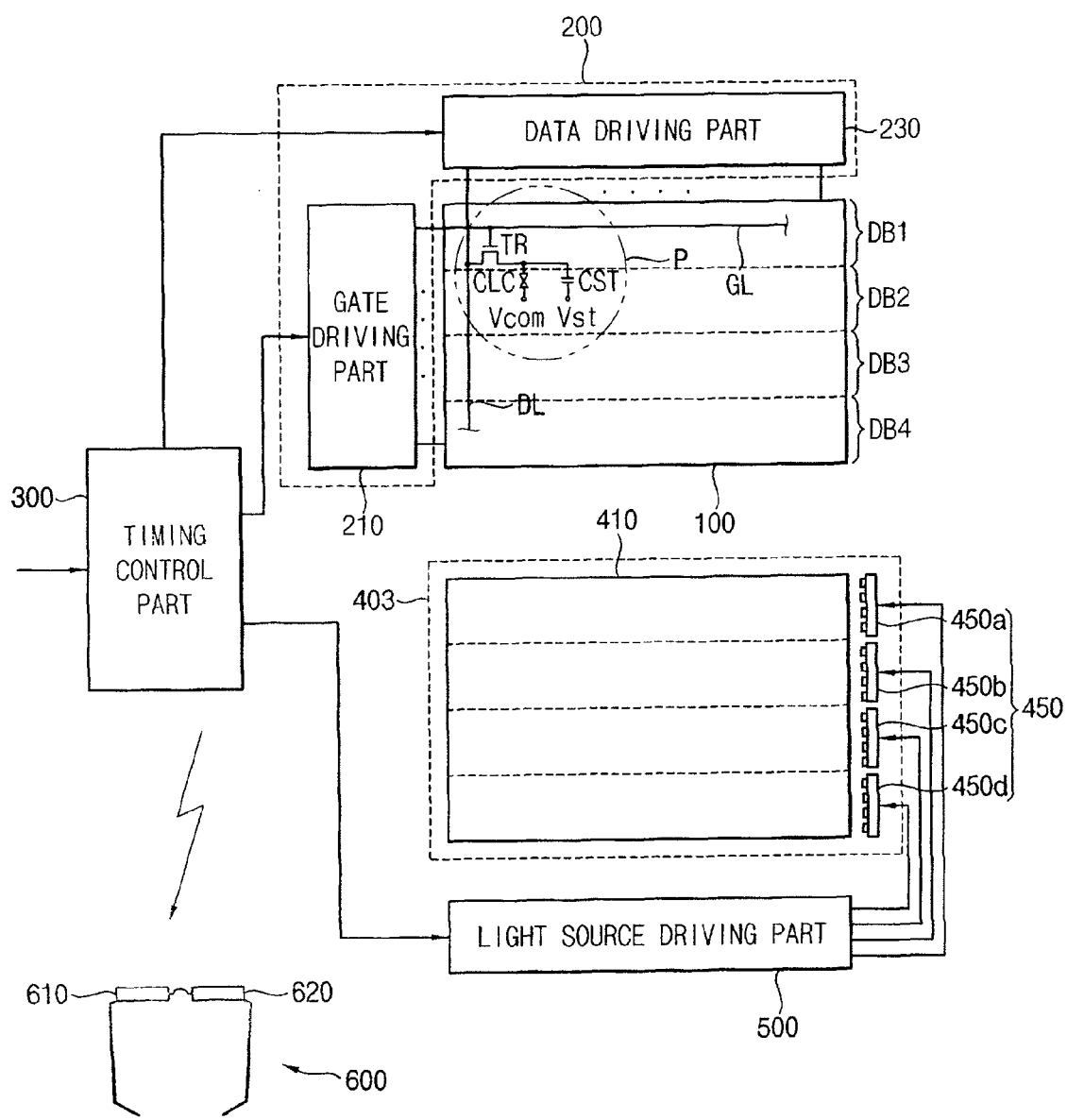
FIG. 7 is a block diagram illustrating a display apparatus according to an exemplary embodiment of the present invention.

FIG. 7 is a block diagram illustrating a display apparatus according to an exemplary embodiment of the present invention.

Referring to FIG. 7, the display apparatus includes a display panel 100, a panel driving part 200, a timing control part 300, a light providing unit 403 and a light source driving part 500. The display apparatus may further include a pair of shutter glasses 600.

The display panel 100 includes a plurality of pixels P which display an image. Each of the pixels includes a switching element TR electrically connected to a gate line GL and a data line DL, a liquid crystal capacitor CLC connected to the switching element TR and a storage capacitor CST connected to the switching element TR. The display panel 100 may include two substrates opposite to each other and a liquid crystal layer interposed between the two substrates.

The panel driving part 200 may include a gate driving part 210 and a data driving part 230. The gate driving part 210 generates a gate signal for activating the gate line GL and may provide the gate line GL with the gate signal. The data driving part 230 converts an image signal received from the timing control part 300 into a data voltage. The data driving part 230 provides the data line DL with the data voltage.

The timing control part 300 controls a driving timing of the display apparatus based on a synchronizing signal received from an external device (not shown). For example, the timing control part 300 receives a 3D image signal from an external device and provides the data driving part 230 with the 3D image signal. For example, the timing control part 300 generates a 3D image signal and provides the data driving part 230 with the 3D image signal. The 3D image signal may include a left-eye image and a right-eye image. The timing control part 300 controls a driving of the light source driving part 500 based on an image displayed on the display panel 100. Moreover, the timing control part 300 may control a driving of the shutter glasses 600 based on an image displayed on the display panel 100.

The light providing unit 403 may include a light guide plate 410 and a light source part 450.

The light guide plate 410 may be disposed at a first side surface of the light source part 420 to provide the display panel 100 with light provided from the light source part 450.

The light source part 450 provides the display panel 100 with light. The light source part 450 may include k light-emitting blocks (wherein, 'k' is a positive integer greater than 3). For example, the light source part 450 may include a first light-emitting block 450a, a second light-emitting block 450b, a third light-emitting block 450c and a fourth light-emitting block 450d, as shown in FIG. 6. Each of the first to fourth light-emitting blocks 450a, 450b, 450c and 450d may include at least one light source (not shown). Each light source may be a light-emitting diode (LED). Alternatively, the light source may be a fluorescent lamp.

The display panel 100 may be divided into a first display block DB1, a second display block DB2, a third display block DB3 and a fourth display block DB4 corresponding to the first to fourth light-emitting blocks 450a, 450b, 450c and 450d. The first light-emitting block 450a provides the first display block DB1 with light. The second light-emitting block 450b provides the second display block DB2 with light. The third light-emitting block 450c provides the third display block DB3 with light. The fourth light-emitting block 450d provides the fourth display block DB4 with light. Moreover, the light providing unit 403 may further include light-blocking member (not shown). The light-blocking member may be disposed between adjacent light-emitting blocks. The light-blocking member may reduce or block light leaked beyond a corresponding light-emitting block. The light-blocking member may be disposed between the first and second light-emitting blocks 450a and 450b, between the second and third light-emitting blocks 450b and 450c, and between the third and fourth light-emitting blocks 450c and 450d. Moreover, although not shown in drawings, the light source part 450 may further include a fifth light-emitting block, a sixth light-emitting block, a seventh light-emitting block and an eighth light-emitting block that face the first to fourth light-emitting blocks 450a, 450b, 450c, and 450d, respectively. In this case, the light-emitting blocks facing each other may be driven in synchronous.

According to an exemplary embodiment, an edge-type display apparatus is described, in which the light source part 450 is disposed at a side surface of the light-guide plate 410 to direct light onto the display panel 100; however, the present invention is not limited to this particular configuration. For example, a direct-type display apparatus may be adapted to exemplary embodiments of the present invention, in which the first to fourth light-emitting blocks 450a, 450b, 450c and 450d of the light source part 450 are disposed below the display panel 100 to directly provide light onto the display panel 100.

The light source driving part 500 generates light-emitting control signals for driving the first to fourth light-emitting blocks 450a, 450b, 450c and 450d. The light source driving part 500 controls the first to fourth light-emitting blocks 450a, 450b, 450c and 450d at a time that first to fourth left-eye preset times or first to fourth right-eye preset times are elapsed from a time in which a left-eye image or a right-eye image is outputted to each of the display blocks, so that each of the display blocks is turned on. For example, the light source driving part 500 controls the first light-emitting block 450a to emit light at a time that the first left-eye preset time is elapsed from a time in which corresponding left-eye image is outputted to the first display block DB1, and controls the second light-emitting block 450b to emit light at a time that the second left-eye preset time is elapsed from a time in which corresponding left-eye image is outputted to the second display block DB2. The light source driving part 500 controls the first light-emitting block 450a to emit light at a time that the first right-eye preset time is elapsed from a time in which corresponding right-eye image is outputted to the first display block DB1. The first to fourth left-eye preset times or the first to fourth right-eye preset times may be set based on a response speed of the liquid crystal included in the display panel 100. For example, the first to fourth left-eye preset times or the first to fourth right-eye preset times may be greater than or equal to a time required to achieve a luminance corresponding to approximately 60% of a luminance when the liquid crystal is saturated. The first to fourth left-eye preset times or the first to fourth right-eye preset times may be set based on a time in which one frame period is divided by the number of first to fourth light-emitting blocks 450a, 450b, 450c and 450d. For example, the first to fourth left-eye preset times or the first to fourth right-eye preset times may be set to have a value greater than a time in which one frame period is divided by the number of first to fourth light-emitting blocks 450a, 450b, 450c and 450d.

The shutter glasses 600 include a left-eye shutter 610 and a right-eye shutter 620. The shutter glasses 600 may selectively open and close the left-eye shutter 610 and the right-eye shutter 620 in response to a shutter control signal received from the timing control part 300 and so on. For example, the shutter glasses 600 open the left-eye shutter 610 and close the right-eye shutter 620, while light is provided to the first to fourth display blocks DB1, DB2, DB3 and DB4 displaying the left-eye image thereon. Alternatively, the shutter glasses 600 open the right-eye shutter 620 and close the left-eye shutter 610, while light is provided to the first to fourth display blocks DB1, DB2, DB3 and DB4 displaying the right-eye image thereon.

Figure 8:
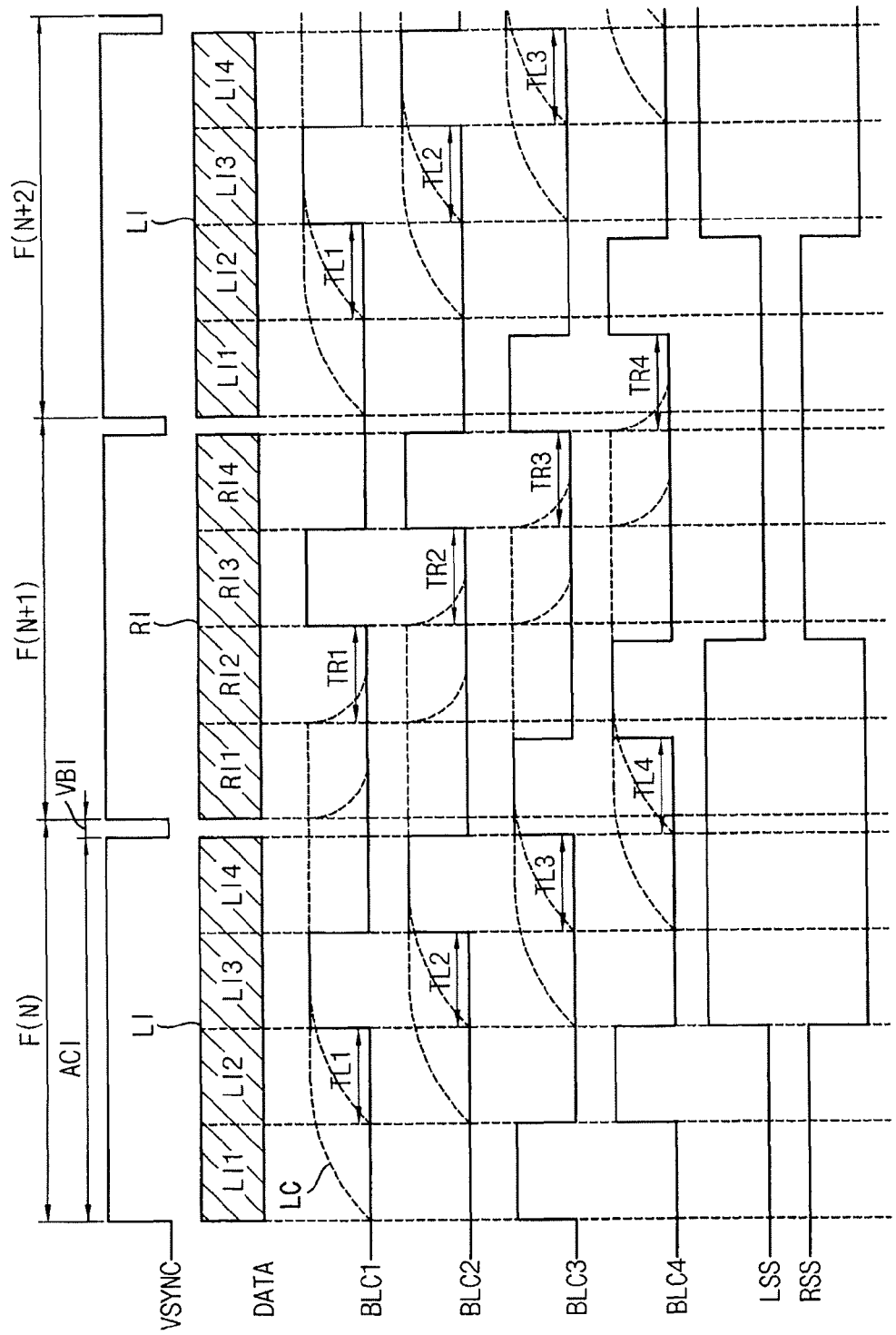
FIG. 8, FIG. 9 and FIG. 10 are timing diagrams illustrating a method for displaying a stereoscopic image by the display apparatus of FIG. 7.
Figure 9:
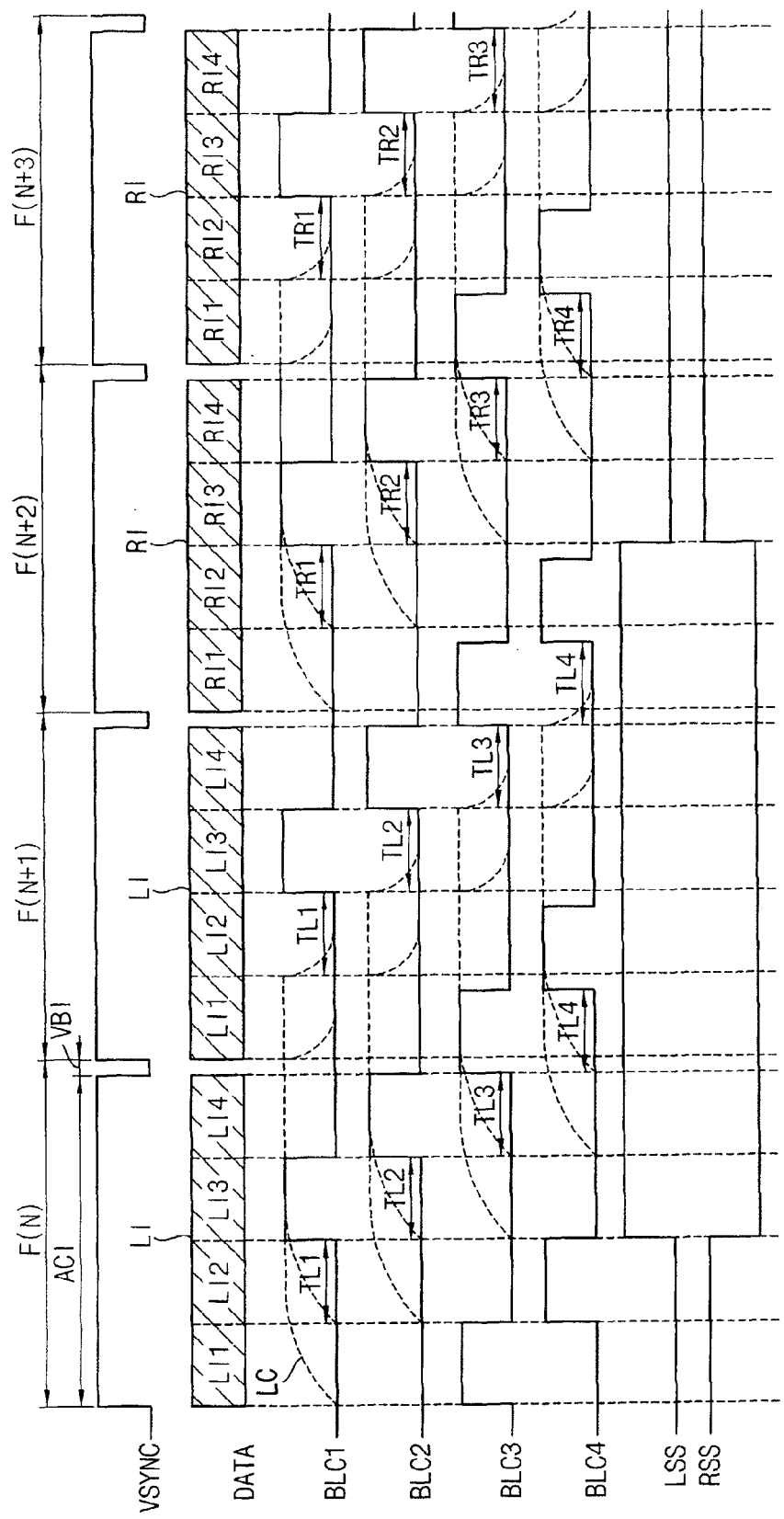
Figure 10:
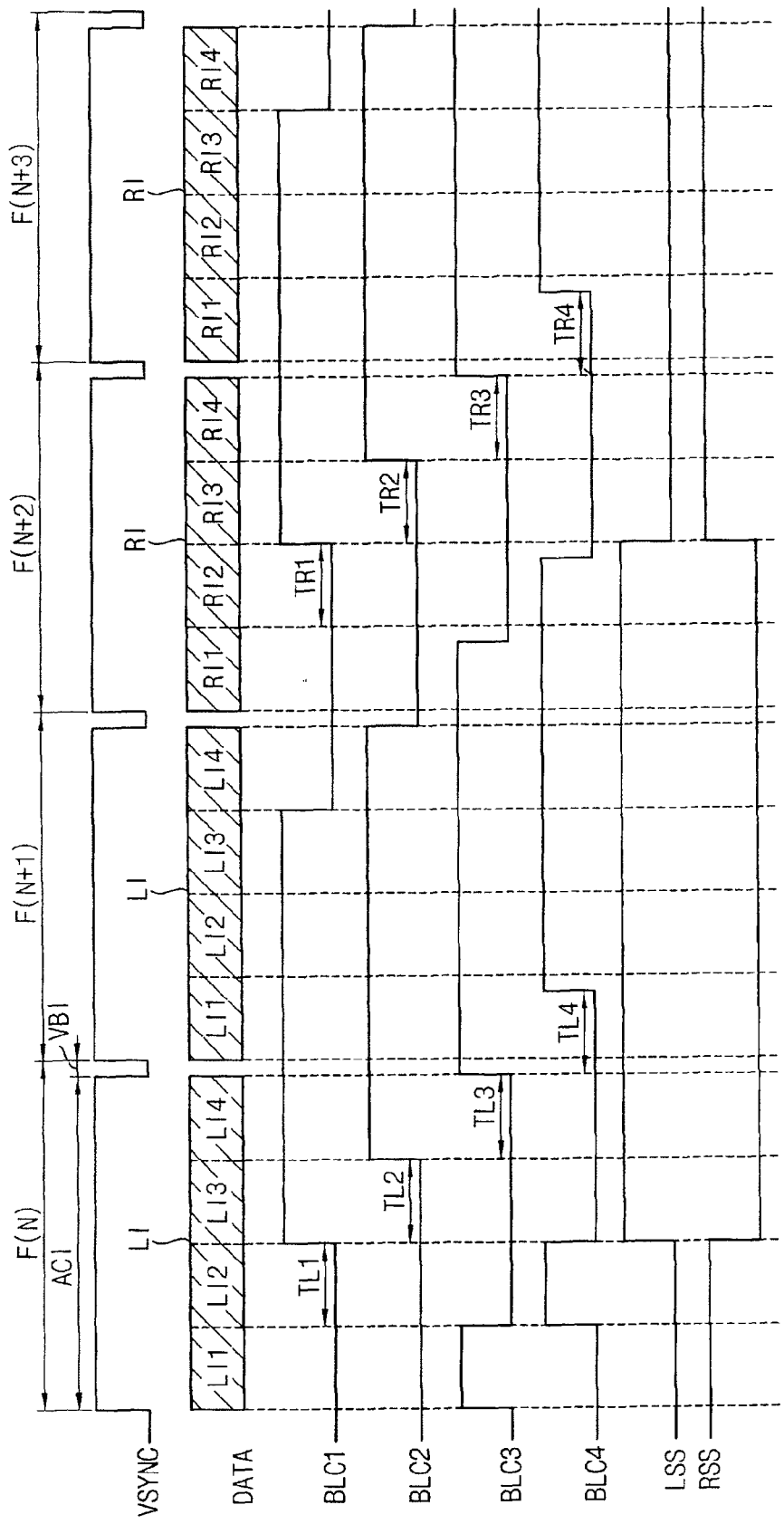

FIGS. 8, 9 and 10 are timing diagrams illustrating a method for displaying a stereoscopic image by the display apparatus of FIG. 7.

Referring to FIGS. 7 to 9, a left-eye image LI is outputted during an N-th frame F(N). In this case, 'N' is a positive integer. The left-eye image LI is outputted based on a vertical synchronization signal VSYNC. The N-th frame may include an active interval ACI and a blanking interval VBI. The left-eye image LI is outputted at the active interval ACI of the N-th frame and may be maintained during the blanking interval VBI. The blanking interval VBI may be set to be less than or equal to approximately 10% of one frame. For example, the blanking interval VBI may be set to be approximately 5% to approximately 6% of one frame period.

The left-eye image LI may be divided into a first left-eye image LI1, a second left-eye image LI2, a third left-eye image LI3 and a fourth left-eye image LI4 corresponding to the first to fourth display blocks DB1, DB2, DB3 and DB4. For example, when the display panel 100 has a resolution of 1920×1080, each of the first to fourth display blocks DB1, DB2, DB3 and DB4 may have a resolution of 1920×270. In this case, the left-eye image LI may have 1920×1080 image data, and each of the first to fourth left-eye images LI1, LI2, LI3 and LI4 may have 1920×270 image data. The display panel 100 may display a frame image having a resolution of 1920×1080 at a frame frequency of approximately 60 Hz or a multiple thereof.

The light source driving part 500 generates a first light-emitting control signal BLC1, a second light-emitting control signal BLC2, a third light-emitting control signal BLC3 and a fourth light-emitting control signal BLC4 so as to respectively drive the first to fourth light-emitting blocks 450a, 450b, 450c and 450d. Each of the first to fourth light-emitting blocks 450a, 450b, 450c and 450d may be turned on in response to the light-emitting control signal of a high level, and may be turned off in response to the light-emitting control signal of a low level.

The first light-emitting block 450a is turned on at a time that the first left-eye preset time TL1 is elapsed from a time in which the first left-eye image LI1 is outputted to the first display block DB1. The second light-emitting block 450b is turned on at a time that the second left-eye preset time TL2 is elapsed from a time in which the second left-eye image LI2 is outputted to the second display block DB2. The third light-emitting block 450c is turned on at a time that the third left-eye preset time TL3 is elapsed from a time in which the third left-eye image LI3 is outputted to the third display block DB3. The fourth light-emitting block 450d is turned on at a time that the fourth left-eye preset time TL4 is elapsed from a time in which the fourth left-eye image LI4 is outputted to the fourth display block DB4. The first to fourth left-eye preset times TL1, TL2, TL3 and TL4 may be substantially equal to each other. Moreover, the first to fourth left-eye preset times TL1, TL2, TL3 and TL4 may be greater than or equal to a time required to achieve a luminance corresponding to approximately 60% of a luminance when the liquid crystal is saturated.

The shutter glasses 600 control opening/closing of the left-eye shutter 610 based on a first shutter control signal LSS and control opening/closing of the right-eye shutter 620 based on a second shutter control signal RSS. The shutter glasses 600 may open the left-eye shutter 610 in response to the first shutter control signal LSS of a high level and may close the left-eye shutter 610 in response to the first shutter control signal LSS of a low level. Moreover, the shutter glasses 600 may open the right-eye shutter 620 in response to the second shutter control signal RSS of a high level and may close the right-eye shutter 620 in response to the second shutter control signal RSS of a low level. The shutter glasses 600 may open the left-eye shutter 610 and may close the right-eye shutter 620 while light generated from the first to fourth light-emitting blocks 450a, 450b, 450c and 450d is provided to the first to fourth display blocks DB1, DB2, DB3 and DB4 on which the left-eye image is displayed. In this case, an emitting time of the first to fourth light-emitting blocks 450a, 450b, 450c and 450d is substantially smaller than or equal to a time that each of the first to fourth left-eye preset times TL1, TL2, TL3 and TL4 is subtracted from one frame interval.

An observer may view the first left-eye image LI1 displayed on the first display block DB1 through the left-eye shutter 610 while the first light-emitting block 420a is turned on and may view the second left-eye image LI2 displayed on the second display block DB2 through the left-eye shutter 610 while the second light-emitting block 420b is turned on. An observer may view the third left-eye image LI3 displayed on the third display block DB3 through the left-eye shutter 610 while the third light-emitting block 450c is turned on and may view the fourth left-eye image LI4 displayed on the fourth display block DB4 through the left-eye shutter 610 while the fourth light-emitting block 450d is turned on.

Moreover, during an M-th frame F(M) (wherein 'M' is a positive integer greater than N), a right-eye image RI is outputted to the display panel 100. FIG. 8 shows that M is N+1, and FIGS. 9 and 10 show that M is greater than N+1. As shown in FIGS. 9 and 10, a left-eye image LI may be outputted to the display panel 100 during the N-th frame F(N) and the left-eye image LI may be outputted to the display panel 100 during an interval from an (N+1)-th frame F(N+1) to an (M−1)-th frame F(M−1) that is a previous frame of an M-th frame in which the right-eye image RI is outputted to the display panel 100. The left-eye image LI outputted during an interval from the (N+1)-th frame F(N+1) to the (M−1)-th frame F(M−1) may be substantially equal to a left-eye image LI of an N-th frame or an image generated based on a left-eye image LI of the N-th frame. The left-eye image LI outputted during the interval from the (N+1)-th frame F(N+1) to the (M−1)-th frame F(M−1) may substantially be a black image represented in grayscale. Similarly to the above, a right-eye image RI may be outputted to the display panel 100 during the M-th frame F(M) and the right-eye image RI may be outputted to the display panel 100 during an interval from an (M+1)-th frame F(M+1) to an (2M−N−1)-th frame F(2M−N−1) that is a previous frame of an (2M−n)-th frame in which the left-eye image LI is outputted to the display panel 100. The right-eye image RI outputted during an interval from the (M+1)-th frame F(M+1) to the (2M−N−1)-th frame F(2M−N−1) may be substantially equal to a right-eye image RI of an M-th frame or an image generated based on a right-eye image RI of the M-th frame. The right-eye image RI outputted during the interval from the (M+1)-th frame F(M+1) to the (2M−N−1)-th frame F(2M−N−1) may substantially be a black image represented in grayscale.

Referring to FIGS. 8 to 10, the right-eye image RI may be outputted during the active interval ACI of the M-th frame, and may be held during the blanking interval VBI. The right-eye image RI may be divided into a first right-eye image RI1, a second right-eye image RI2, a third right-eye image RI3 and a fourth right-eye image RI4 corresponding to the first to fourth display blocks DB1, DB2, DB3 and DB4 of the display panel 100, respectively.

Each of the first to fourth light-emitting blocks 450a, 450b, 450c and 450d may be turned on in response to a light-emitting control signal of a high level and may be turned off in response to a light-emitting control signal of a low level. The first light-emitting block 450a is turned on at a time that a first right-eye preset time TR1 is elapsed from a time in which the first right-eye image RI1 is outputted to the first display block DB1. The second light-emitting block 450b is turned on at a time that a second right-eye preset time TR2 is elapsed from a time in which the second right-eye image RI2 is outputted to the second display block DB2. The third light-emitting block 450c is turned on at a time that a third right-eye preset time TR3 is elapsed from a time in which the third right-eye image RI3 is outputted to the third display block DB3. The fourth light-emitting block 450d is turned on at a time that a fourth right-eye preset time TR4 is elapsed from a time in which the fourth right-eye image RI4 is outputted to the fourth display block DB4. The first to fourth right-eye preset times TR1, TR2, TR3 and TR4 may be substantially equal to each other. Moreover, the first to fourth right-eye preset times TR1, TR2, TR3 and TR4 may be greater than or equal to a time required to achieve a luminance corresponding to approximately 60% of a luminance when the liquid crystal is saturated. Moreover, the first left-eye preset time TL1 and the first right-eye preset time TR1 may be substantially equal to each other and the second left-eye preset time TL2 and the second right-eye preset time TR2 may be substantially equal to each other. The third left-eye preset time TL3 and the third right-eye preset time TR3 may be substantially equal to each other and the fourth left-eye preset time TL4 and the fourth right-eye preset time TR4 may be substantially equal to each other. Furthermore, the first to fourth left-eye preset times TL1, TL2, TL3 and TL4 and the first to fourth right-eye preset times TR1, TR2, TR3 and TR4 may be substantially equal to each other.

The shutter glasses 600 open the right-eye shutter 620 and close the left-eye shutter 610, while light emitted from the first to fourth light-emitting blocks 450a, 450b, 450c and 450d are respectively provided to the first to fourth display blocks DB1, DB2, DB3 and DB4 on which the right-eye image is displayed. In this case, an emitting time of the first to fourth light-emitting blocks 450a, 450b, 450c and 450d is substantially smaller than or equal to a time that each of the first to fourth right-eye preset times TR1, TR2, TR3 and TR4 is subtracted from one frame interval.

An observer may view the first right-eye image RH displayed on the first display block DB1 through the right-eye shutter 620 while the first light-emitting block 450a is turned on and may view the second right-eye image RI2 displayed on the second display block DB2 through the right-eye shutter 620 while the second light-emitting block 450b is turned on. An observer may view the third right-eye image RI3 displayed on the third display block DB3 through the right-eye shutter 620 while the third light-emitting block 450c is turned on and may view the fourth right-eye image RI4 displayed on the fourth display block DB4 through the right-eye shutter 620 while the fourth light-emitting block 450d is turned on.

According to an exemplary embodiment, the left-eye image and the right-eye image are divided into four images, respectively, so that generation of crosstalk between the left-eye and right-eye images may be reduced or prevented. Accordingly, a display quality of a 3D stereoscopic image may be increased.

In FIGS. 7 to 10, illustrate four display blocks and four light-emitting blocks as an example. Alternatively, the number of the display blocks and the number of light-emitting blocks may be three or greater than or equal to five.

Figure 11:
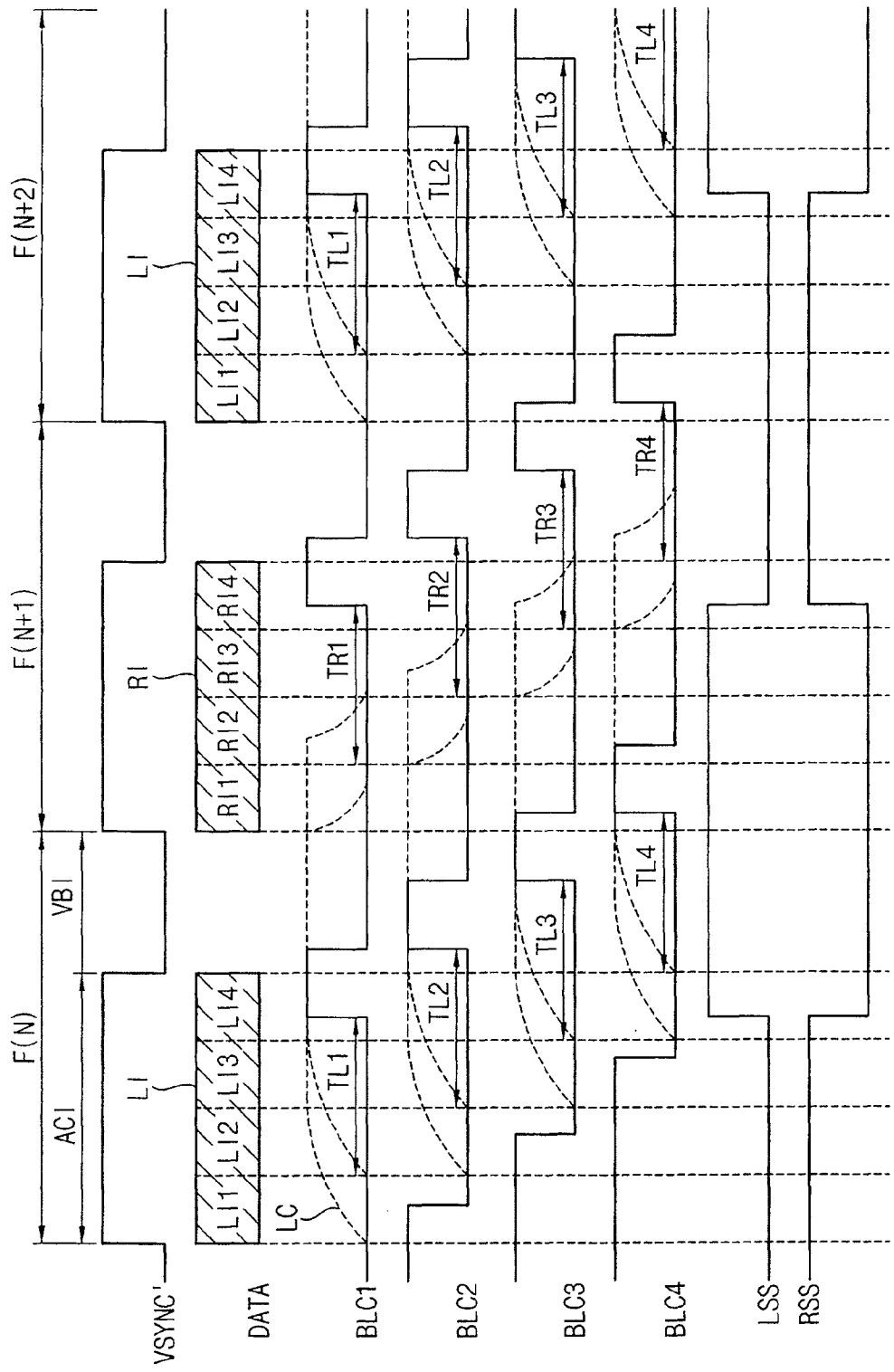
FIG. 11 is a timing diagram illustrating a method for displaying a stereoscopic image in accordance with an exemplary embodiment of the present invention.

FIG. 11 is a timing diagram illustrating a method for displaying a stereoscopic image in accordance with an exemplary embodiment of the present invention.

The display apparatus according to an exemplary embodiment may be substantially the same as the display apparatus of FIGS. 7 to 10 with the addition of a vertical synchronization signal VSYNC applied to the timing control part 300, so that a description of the display apparatus may refer back to FIG. 6. Moreover, a method of displaying a stereoscopic image according to an exemplary embodiment may be substantially the same as the method of displaying a stereoscopic image described above with reference to FIGS. 8 to 10 with the addition of the synchronization signal VSYNC, first, second, third and fourth light-emitting control signals BLC1, BLC2, BLC3 and BLC4, and first and second shutter control signals LSS and RSS.

Referring to FIGS. 7 and 11, during an N-th frame ('N' is a positive integer) F(N), a left-eye image LI is outputted to the display panel 100. The left-eye image LI is outputted in synchronized with a vertical synchronization signal VSYNC. The left-eye image LI is outputted at the active interval ACI of the vertical synchronization signal VSYNC and is maintained during the blanking interval VBI. The blanking interval VBI may be set to be greater than or equal to approximately 10% of one frame period. In this case, the blanking interval VBI may be set to be greater than or equal to approximately 30% of one frame period. For example, the blanking interval VBI may be set to be greater than or equal to approximately 32% of one frame period.

The display panel 100 may be divided into the first to fourth display blocks DB1, DB2, DB3 and DB4 corresponding to the first to fourth light-emitting blocks 450a, 450b, 450c and 450d, respectively. The left-eye image LI may be divided into a first left-eye image LI1, a second left-eye image LI2, a third left-eye image LI3 and a fourth left-eye image LI4 corresponding to the first to fourth display blocks DB1, DB2, DB3 and DB4, respectively.

Each of the first to fourth light-emitting blocks 450a, 450b, 450c and 450d may be turned on in response to the light-emitting control signal of a high level and may be turned off in response to the light-emitting control signal of a low level. The first light-emitting block 450a is turned on at a time that the first left-eye preset time TL1 is elapsed from a time in which the first left-eye image LI1 is outputted to the first display block DB1. The second light-emitting block 450b is turned on at a time that the second left-eye preset time TL2 is elapsed from a time in which the second left-eye image LI2 is outputted to the second display block DB2. The third light-emitting block 450c is turned on at a time that the third left-eye preset time TL3 is elapsed from a time in which the third left-eye image LI3 is outputted to the third display block DB3. The fourth light-emitting block 450d is turned on at a time that the fourth left-eye preset time TL4 is elapsed from a time in which the fourth left-eye image LI4 is outputted to the fourth display block DB4. The first to fourth left-eye preset times TL1, TL2, TL3 and TL4 may be set based on a response speed of the liquid crystal. For example, the first to fourth left-eye preset times TL1, TL2, TL3 and TL4 may be greater than or equal to a time required to achieve a luminance corresponding to approximately 60% of a luminance when the liquid crystal is saturated.

The shutter glasses 600 open the left-eye shutter 610 and close the right-eye shutter 620 while light emitted from the first to fourth light-emitting blocks 450a, 450b, 450c and 450d are provided to the first to fourth display blocks DB1, DB2, DB3 and DB4 on which the left-eye image is displayed. The left-eye shutter 610 is opened at a time in which the first light-emitting block 450a is turned on corresponding to the left-eye image LI, and is closed before the first light-emitting block 450a is turned on corresponding to the right-eye image RI.

An observer may view the first left-eye image LI1 through the left-eye shutter 610 while the first light-emitting block 420a is turned on and may view the second left-eye image LI2 through the left-eye shutter 610 while the second light-emitting block 420b is turned on. An observer may view the third left-eye image LI3 through the left-eye shutter 610 while the third light-emitting block 450c is turned on and may view the fourth left-eye image LI4 through the left-eye shutter 610 while the fourth light-emitting block 450d is turned on.

Moreover, during an M-th frame F(M) (wherein, 'M' is a positive integer greater than 'N'), a right image RI is outputted to the display panel 100. A case in which M is N+1 as an example is described above with reference to FIG. 11. The right-eye image RI may be divided into a first right-eye image RI1, a second right-eye image RI2, a third right-eye image RI3 and a fourth right-eye image RI4 corresponding to the first to fourth display blocks DB1, DB2, DB3 and DB4 of the display panel 100, respectively.

Each of the first to fourth light-emitting blocks 450a, 450b, 450c and 450d may be turned on in response to a light-emitting control signal of a high level and may be turned off in response to a light-emitting control signal of a low level. The first light-emitting block 450a is turned on at a time that a first right-eye preset time TR1 is elapsed from a time in which the first right-eye image RI1 is outputted to the first display block DB1. The second light-emitting block 450b is turned on at a time that a second right-eye preset time TR2 is elapsed from a time in which the second right-eye image RI2 is outputted to the second display block DB2. The third light-emitting block 450c is turned on at a time that a third right-eye preset time TR3 is elapsed from a time in which the third right-eye image RI3 is outputted to the third display block DB3. The fourth light-emitting block 450d is turned on at a time that a fourth right-eye preset time TR4 is elapsed from a time in which the fourth right-eye image R14 is outputted to the fourth display block DB4. The first to fourth right-eye preset times TR1, TR2, TR3 and TR4 may be greater than or equal to a time required to achieve a luminance corresponding to approximately 60% of a luminance when the liquid crystal is saturated. Moreover, the first left-eye preset time TL1 and the first right-eye preset time TR1 may be substantially equal to each other, and the second left-eye preset time TL2 and the second right-eye preset time TR2 may be substantially equal to each other. The third left-eye preset time TL3 and the third right-eye preset time TR3 may be substantially equal to each other, and the fourth left-eye preset time TL4 and the fourth right-eye preset time TR4 may be substantially equal to each other. Furthermore, the first to fourth left-eye preset times TL1, TL2, TL3 and TL4 and the first to fourth right-eye preset times TR1, TR2, TR3 and TR4 may be substantially equal to each other.

The shutter glasses 600 open the right-eye shutter 620 and close the right-eye shutter 620, while light emitted from the first to fourth light-emitting blocks 450a, 450b, 450c and 450d are provided to the first to fourth display blocks DB1, DB2, DB3 and DB4 on which the left-eye image is displayed. The left-eye shutter 610 is opened at a time in which the first light-emitting block 450a is turned on corresponding to the right-eye image RI and is closed before the first light-emitting block 450a is turned on in correspondence with the right-eye image RI.

An observer may view the first left-eye image LI1 through the left-eye shutter 610 while the first light-emitting block 450a is turned on and may view the second left-eye image LI2 through the left-eye shutter 610 while the second light-emitting block 420b is turned on. An observer may view the third left-eye image LI3 through the left-eye shutter 610 while the third light-emitting block 450c is turned on and may view the fourth left-eye image LI4 through the left-eye shutter 610 while the fourth light-emitting block 450d is turned on.

According to an exemplary embodiment, since the blanking interval VBI of the vertical synchronization signal VSYNC is relatively expanded with respect to a blanking interval VBI of the vertical synchronization signal VSYNC shown in FIG. 8, an active interval for displaying the left-eye image LI or the right-eye image RI may be shortened. Thus, a driving margin of the light source part 450 may be determined. For example, a light-emitting duty width of the first to fourth light-emitting blocks 450a, 450b, 450c and 450d may be increased with respect to a method of displaying a stereoscopic image in accordance with the description provided above with respect to FIG. 8. Accordingly, when light-emitting duty widths of the first to fourth light-emitting blocks 450a, 450b, 450c and 450d are increased, luminance of the display panel 100 may be increased. Accordingly, a display quality of a 3D stereoscopic image may be increased.

In FIG. 11, four display blocks and four light-emitting blocks are shown. As an alternative to this structure, the number of the display blocks and the number of light-emitting blocks may be three or greater or equal to five.

Figure 12:
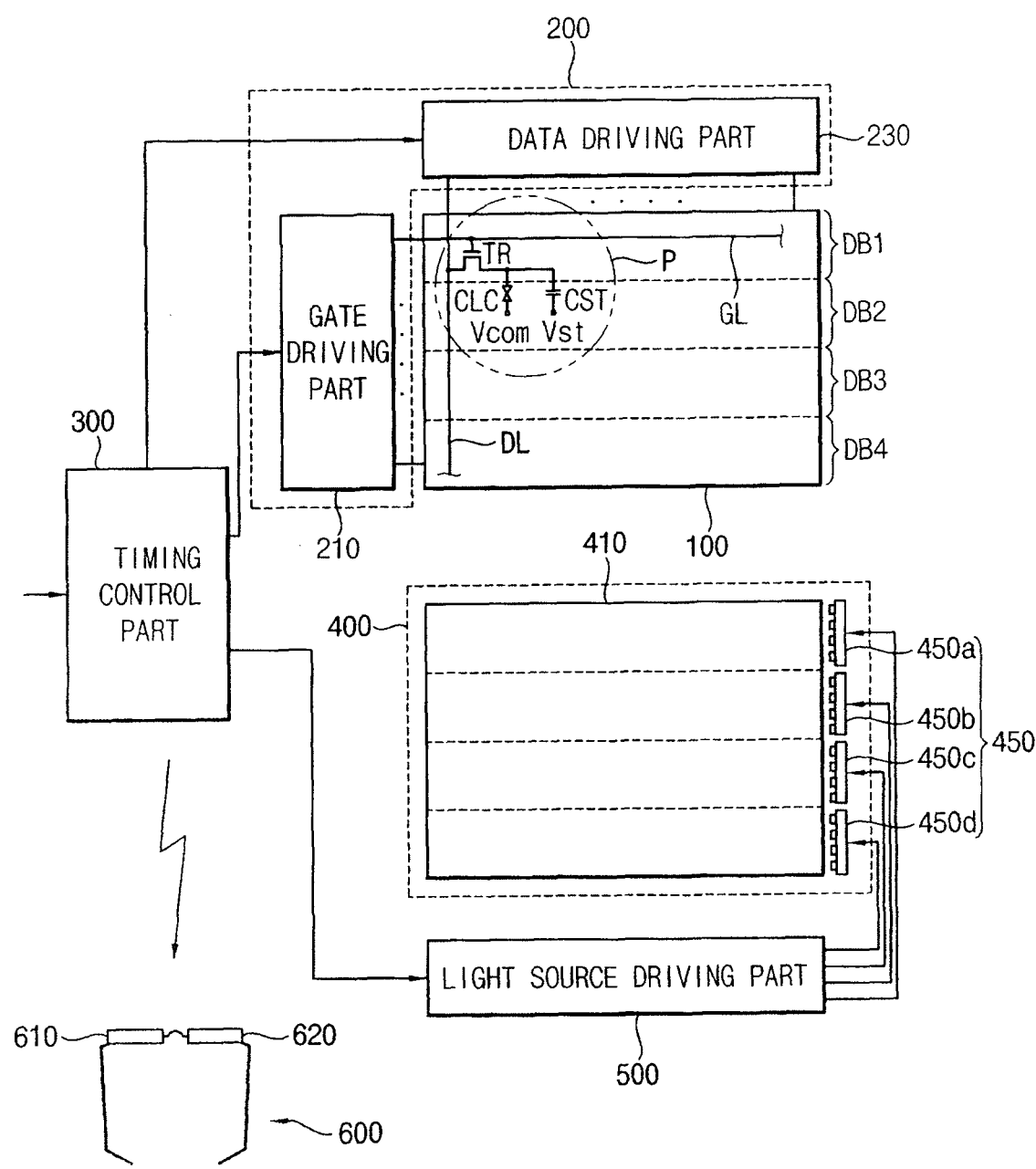
FIG. 12 is a block diagram illustrating a display apparatus according to an exemplary embodiment of the present invention.

FIG. 12 is a block diagram illustrating a display apparatus according to an exemplary embodiment of the present invention.

Referring to FIG. 12, the display apparatus includes a display panel 100, a panel driving part 200, a timing control part 300, a light providing unit 400 and a light source driving part 500. The display apparatus may further include a pair of shutter glasses 600. In FIG. 12, the same reference numerals will be used to refer to the same or like parts as those described above with reference to FIG. 7, and any further explanation concerning the above elements will be omitted.

The light guide plate 410 is disposed below the display panel 100. The light source part 450 includes first to k-th light-emitting blocks (wherein, 'k' is a positive integer) that are arranged in a scanning direction. Hereinafter, it will be described that the light source part 450 includes first, second, third and fourth light-emitting blocks 450a, 450b, 450c and 450d. Each of the first to fourth light-emitting blocks 450a, 450b, 450c and 450d includes a light source generating light. For example, the first to fourth light-emitting blocks 450a, 450b, 450c and 450d may be disposed at a first edge of the light guide plate 410 as shown in FIG. 12. Alternatively, the first to fourth light-emitting blocks 450a, 450b, 450c and 450d may be disposed at two edges of the light guide plate 410 which face each other. Alternatively, the light guide plate 410 may be omitted from the light source part 450 and the light source part 450 may be positioned directly below the display panel 100. In this case, the light source may be a fluorescent lamp or a light-emitting diode (LED).

The light source driving part 500 controls a turning on and a turning off of the first to fourth light-emitting blocks 450a, 450b, 450c and 450d of the light source part 450 in accordance with an image displayed on the display panel 100. The first to fourth light-emitting blocks 450a, 450b, 450c and 450d are sequentially driven. The light source driving part 500 individually controls light-emitting intervals of the first to fourth light-emitting blocks 450a, 450b, 450c and 450d. Thus, an all off interval in which each of the first to fourth light-emitting blocks 450a, 450b, 450c and 450d are turned off and a sequential on interval in which each of the first to fourth light-emitting blocks 450a, 450b, 450c and 450d are sequentially turned on are included in one frame period.

The shutter glasses 600 may include a left-eye shutter 610 and a right-eye shutter 620. In this case, the left-eye shutter 610 and the right-eye shutter 620 may each include a liquid crystal shutter in which an electric field is used to align liquid crystal to either permit or block light. The shutter glasses 600 may selectively open and close the left-eye shutter 610 and the right-eye shutter 620 based on a shutter control signal provided from the timing control part 300. The timing control part 300 may provide the shutter control signal to the shutter glasses either wirelessly or through a cable running therebetween. The shutter control signal may include a left-eye opening signal for opening the left-eye shutter 610, a left-eye closing signal for closing the left-eye shutter 610, a right-eye opening signal for opening the right-eye shutter 620 and a right-eye closing signal for closing the right-eye shutter 620. In the shutter control signal, the left-eye opening signal, the right-eye closing signal, the right-eye opening signal and the left-eye closing signal are sequentially provided in accordance with a response speed of a liquid crystal in which a rising time is smaller than a falling time.

For example, when a left-eye data frame is outputted to the display panel 100 during an N-th frame (wherein 'N' is a positive integer), the timing control part 300 sequentially provides the left-eye opening signal and the right-eye closing signal to the shutter glasses 600 within the all off interval of the N-th frame. When a right-eye data frame is outputted to the display panel 100 during an (N+1)-th frame, the timing control part 300 sequentially provides the right-eye opening signal and the left-eye closing signal to the shutter glasses 600 within the all off interval of the (N+1)-th frame. Thus, the shutter glasses 600 may generate a left-eye shutter signal for opening and closing the left-eye shutter 610 and a right-eye shutter signal for opening and closing the right-eye shutter 620 based on the left-eye opening signal, the right-eye closing signal, the right-eye opening signal and the left-eye closing signal from the timing control part 300 to drive the left-eye shutter 610 and the right-eye shutter 620.

The shutter glasses 600 starts the opening and closing operation within the all off interval, so that a crosstalk (i.e., a 3D crosstalk) between a left-eye image and a right-eye image may be reduced or prevented. The 3D crosstalk may otherwise be attributable to the right eye seeing the left-eye image or the left eye seeing the right-eye image in the period of time between when the corresponding shutter begins to close and when it is fully closed owing to the response speed of the liquid crystal of the shutter glasses 600. The all off interval may be greater than or equal to a response speed of a liquid crystal of the shutter glasses 600.

Light is provided to first, second, third and fourth display blocks DB1, DB2, DB3 and DB4 of the display panel 100 corresponding to the first, second, third and fourth light-emitting blocks 450a, 450b, 450c and 450d, respectively. In addition, the left-eye data frame may be a white data and the right-eye data frame may be a black data.

Figure 13:
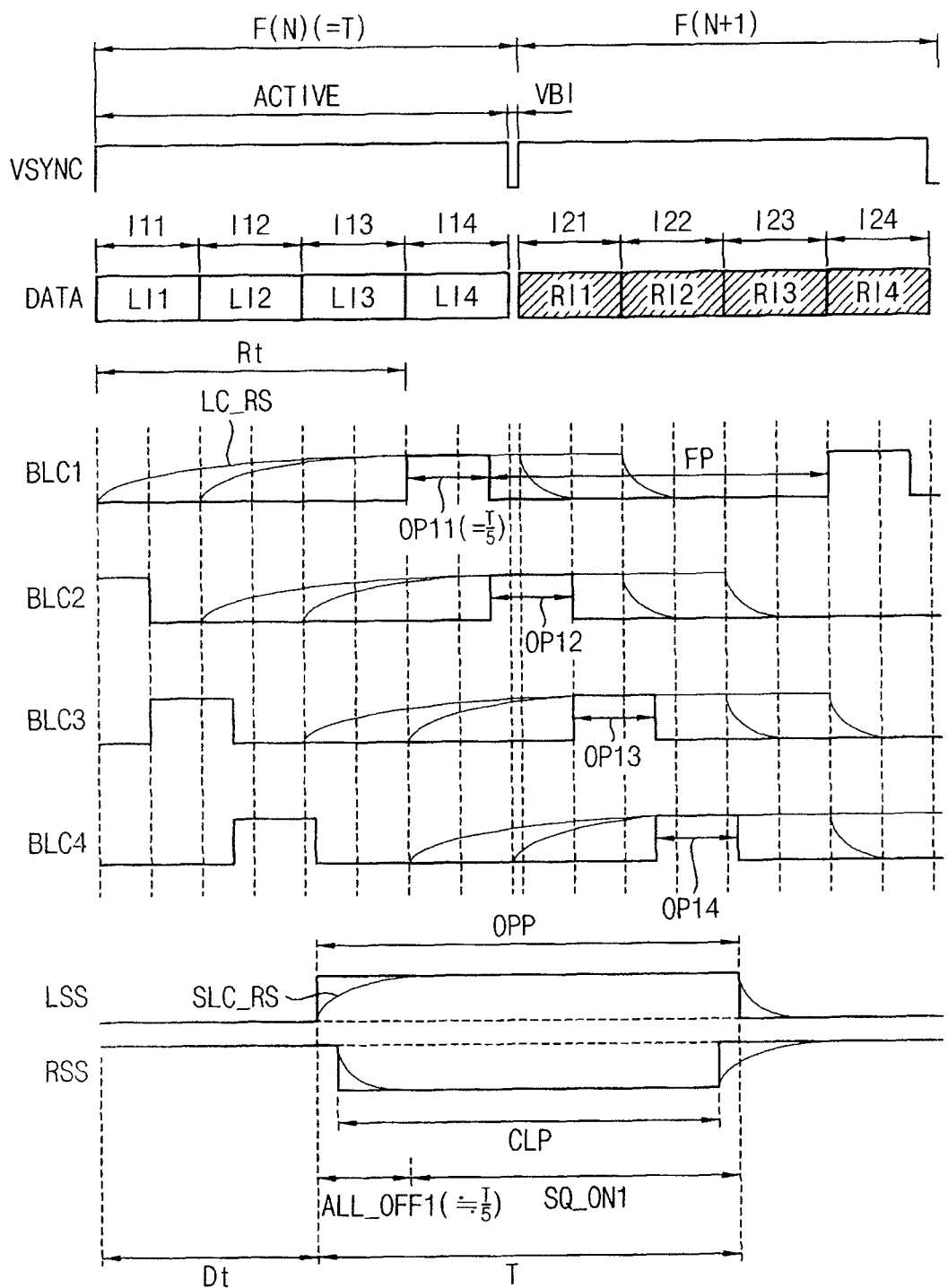
FIG. 13 includes timing diagrams illustrating an example of a method for displaying a stereoscopic image using the display apparatus of FIG. 12.

FIG. 13 includes timing diagrams illustrating a first example of a method for displaying a stereoscopic image by the display apparatus of FIG. 12.

Referring to FIGS. 12 and 13, one frame may include an active interval ACTIVE and a blank interval VBI based on a vertical synchronization signal VSYNC. The active interval ACTIVE is an interval in which data are outputted to the display panel, and the blank interval VBI is an interval in which the data are maintained. The blank interval VBI may be set to have a duration of approximately 5% to approximately 6% of one frame period.

During an N-th frame F(N), the panel driving part 200 outputs a left-eye data frame to the display panel 100. The left-eye data frame may include first, second, third and fourth left-eye data blocks LI1, LI2, LI3 and LI4. The data frame may be data corresponding to 920×1080 resolution and each of the data blocks may be data corresponding to 920×270 resolution.

The panel driving part 200 sequentially outputs the first left-eye data block LI1 in a horizontal line unit during a first interval I11 of the N-th frame F(N) and outputs the second left-eye data block LI2 in a horizontal line unit during a second interval I12 of the N-th frame F(N). In addition, the panel driving part 200 sequentially outputs the third left-eye data block LI3 in a horizontal line unit during a third interval I13 of the N-th frame F(N) and outputs the fourth data block LI4 for the left-eye in a horizontal line unit during a fourth interval I14 of the N-th frame F(N). For example, the first display block DB1 displays an image corresponding to a first line data of the first left-eye data block LI1 after a middle of a second interval I2 in accordance with a response speed of a liquid crystal LC_RS. In addition, the first display block DB1 displays an image corresponding to a last line data of the first left-eye data block L11 after a middle of a third interval I3 in accordance with a response speed of a liquid crystal LC_RS.

The panel driving part 200 outputs the left-eye data frame to the display panel 100 during the N-th frame F(N) and the display panel 100 displays a left-eye image delayed by a response speed of a liquid crystal with respect to a starting point of the N-th frame F(N).

During an (N+1)-th frame F(N+1), the panel driving part 200 outputs a right-eye data frame to the display panel 100. The right-eye data frame includes first, second, third and fourth right-eye data blocks RI1, R12, RI3 and RI4. The panel driving part 200 sequentially outputs the first right-eye data block RI1 in a horizontal line unit during a first interval I21 of an (N+1)-th frame F(N+1). The second right-eye data block RI2 is sequentially output in a horizontal line unit during a second interval I22 of the (N+1)-th frame F(N+1). In addition, the panel driving part 200 sequentially outputs the third right-eye data block RI3 in a horizontal line unit during a third interval I23 of the (N+1)-th frame F(N+1). The fourth right-eye data block R14 is sequentially output in a horizontal line unit during a third interval I24 of the (N+1)-th frame F(N+1).

The panel driving part 200 outputs the right-eye data frame to the display panel 100 during the (N+1)-th frame F(N+1) and the display panel 100 displays a right-eye image delayed by a response speed of a liquid crystal LC_RS with respect to a starting point of the (N+1)-th frame F(N+1).

The light source driving part 500 sequentially drives the first to fourth light-emitting blocks 450a, 450b, 450c and 450d after a set time Rt is elapsed with respect to a starting point of one frame. A driving margin time of the display panel 100 that is influenced by the response speed of a liquid crystal LC_RS may also be used to determine when each of the four light-emitting blocks 450a, 450b, 450c and 450d are driven. The set time Rt may be, for example, greater than the response speed of a liquid crystal LC_RS of the display panel 100.

For example, the light source driving part 500 generates first, second, third and fourth light-emitting control signals BLC1, BLC2, BLC3 and BLC4 and drives the light source part 450, and in particular, the first to fourth light-emitting blocks 450a, 450b, 450c and 450d, respectively. In each of the first, second, third and fourth light-emitting control signals BLC1, BLC2, BLC3 and BLC4, a light-emitting interval having a high level which turns on each light-emitting blocks and a light-outing having a low level which turns off each light-emitting blocks may be repeated in a frame period T.

The first light-emitting block 450a is turned on or turned off in response to the first light-emitting control signal BLC1. The first light-emitting control signal BLC1 has a first light-emitting interval OP11. The first light-emitting interval OP11 is started at a time after the set time Rt is elapsed from a start point of an N-th frame F(N). The time between the start of the first light-emitting interval OP11 and the time after the set time Rt has elapsed after the start point of the N-th frame F(N) may also be influenced by a response speed of a liquid crystal of the display panel 100.

The first light-emitting block 450a emits light during the first light-emitting interval OP1 in response to the first light-emitting control signal BLC1. As shown in FIG. 13, the first light-emitting block 450a emits light during the first light-emitting interval OP11 from a time in which an outputting of the last line data of the third left-eye data block LI3 is completed, in response to the first light-emitting control signal BLC1. The first light-emitting block OP11 may be approximately ⅓ of the frame period T. During the first light-emitting interval OP11, a first left-eye block image corresponding to the first left-eye data block LI1 is completed on the first display block DB1, and second, third and fourth left-eye block images are not completed on the second, third and fourth display blocks DB2, DB3 and DB4, due to a response speed of a liquid crystal LC_RS. The first light-emitting block 450a emits light during an interval in which the first left-eye block image is completed and within which the first display block DB1 is maintained.

The second light-emitting block 450b is turned on or turned off in response to the second light-emitting control signal BLC2. The second light-emitting control signal BLC2 has a second light-emitting interval OP12. The second light-emitting block 450b is simultaneously turned on after the first light-emitting interval OP11 in response to the second light-emitting control signal BLC2 and the second light-emitting block 450b emits light during the second light-emitting interval OP12. The second light-emitting interval OP12 may correspond to approximately ⅓ of the frame period T. During the second light-emitting interval OP12, a second left-eye block image corresponding to the second left-eye data block LI2 is completed on the second display block DB2. As the first right-eye data block RI1 is provided to the first display block DB1, the first right-eye block image and the first right-eye block image are mixed to be displayed on the first display block DB1. Moreover, third and fourth left-eye block images are not completed on the third and fourth display blocks DB3 and DB4 due to a response speed of a liquid crystal. As a result, the second light-emitting block 450b emits light during an interval in which the second left-eye block image is completed and within which the second display block DB2 is maintained.

The third light-emitting block 450c is turned on or turned off in response to the third light-emitting control signal BLC3. The third light-emitting control signal BLC3 has a third light-emitting interval OP13. The third light-emitting block 450c is simultaneously turned on after the second light-emitting interval OP12 in response to the third light-emitting control signal BLC3. The third light-emitting block 450c emits light during the third light-emitting interval OP13. The third light-emitting interval OP13 may be approximately ⅕ of the frame period T. During the third light-emitting interval OP13, a third left-eye block image corresponding to the third left-eye data block L13 is completed on the third display block DB3. A first right-eye block image is displayed on the first display block DB1, and a mixing image in which a second left-eye block image and a second right-eye block image are mixed is displayed on the second display block DB2. A fourth left-eye block image is not completed on the fourth display block DB4. As a result, the third light-emitting block 450c emits light during an interval in which the third left-eye block image is completed and within which the third display block DB3 is maintained.

The fourth light-emitting block 450d is simultaneously turned on after the third light-emitting interval OP13 in response to the fourth light-emitting control signal BLC4. The fourth light-emitting block 450d emits light during the fourth light-emitting interval OP14. The fourth light-emitting interval OP14 may correspond to approximately ⅕ of the frame period T. During the fourth light-emitting interval OP14, a fourth left-eye block image corresponding to the fourth left-eye data block L14 is completed on the fourth display block DB4. A first right-eye block image is displayed on the first display block DB1 and a second left-eye block image and a second right-eye block image are mixed and displayed on the second display block DB2. A third left-eye block image and a third right-eye block image are mixed and displayed on the third display block DB3. As a result, the fourth light-emitting block 450d emits light during an interval in which the fourth left-eye block image is completed and within which the fourth display block DB4 is maintained.

As shown in FIG. 13, the light source part 450 has a delay difference Dt for a start point of the N-th frame F(N) and repeats an operation in the frame period T. An operation period of the light source part 450 has a sequential on interval SQON1 corresponding to approximately 4T/5 interval within which the first to fourth light-emitting blocks 450a, 450b, 450c and 450d sequentially emit light. The operation period of the light source part also has an all off interval ALL_OFF1 in which the first to fourth light-emitting blocks 450a, 450b, 450c and 450d are turned off for approximately a T/5 interval before the first light-emitting block 450a emits light.

According to exemplary embodiments of the present invention, the shutter glasses 600 generate a left-eye shutter signal LSS and a right-eye shutter signal RSS and drive the left-eye shutter 610 and the right-eye shutter 620. The left-eye shutter 610 may be opened when the left-eye shutter signal LSS has a high level and may be closed when the left-eye shutter signal LSS has a low level. Moreover, the right-eye shutter 620 may be opened when the right-eye shutter signal RSS has a high level and may be closed when the right-eye shutter signal RSS has a low level.

The shutter glasses 600 open and close the left-eye shutter 610 and the right-eye shutter 620 in response to a left-eye shutter signal LSS and a right-eye shutter signal RSS, respectively.

According to an operation of the display panel 100 and the light source part 450, the display panel 100 displays the left-eye image during a period of time from the first light-emitting interval OP11 to the fourth light-emitting interval OP14. The left-eye shutter signal LSS has an opening interval OPP corresponding to the first to fourth light-emitting intervals OP11, OP12, OP13 and OP14. The left-eye shutter 610 is opened during the opening interval OPP. The right-eye shutter signal RSS has a close interval CLP corresponding to the first to fourth light-emitting intervals OP11, OP12, OP13 and OP14. The right-eye shutter 620 is closed during the opening interval OPP. Each of the opening interval OPP and the close interval CLP includes an all off interval ALL_OFF1 within which the first, second, third and fourth light-emitting blocks 450a, 450b, 450c and 450d are turned off.

Opening and closing operations of the left-eye shutter 610 and the right-eye shutter 620 are activated within the all off interval ALL_OFF1. A liquid crystal margin time may be determined according to a response speed of a liquid crystal SLC_RS of the left-eye shutter 610 and the right-eye shutter 620. The all off interval ALL_OFF1 may be greater than the response speed of a liquid crystal SLC_RS of the shutter glasses 600. As such, the left-eye shutter 610 and the right-eye shutter 620 are fully opened and closed in an interval in which the left-eye image (or the right-eye image) is substantially maintained. Accordingly, 3D crosstalk between the left-eye and right-eye images may be reduced or prevented.

Moreover, a falling time is greater than a rising time in accordance with the response speed of a liquid crystal of the shutter glasses 600. Accordingly, a rising time point of the left-eye signal LSS leads a falling time point of the right-eye shutter signal RSS and a driving delay time of the shutter glasses 600 may be decreased. As such, the opening intervals OPP of the left-eye and right-eye shutter signals LSS and RDD may be greater than the closing interval CLP.

Therefore, crosstalk between the left-eye image and the right-eye image due to a response speed of a liquid crystal SLC_RS of the shutter glasses 600 may be reduced or prevented.

Hereinafter, the same reference numerals will be used to refer to the same or like parts as those described above explained and further explanation concerning the above elements may be omitted or simplified.

Figure 14:
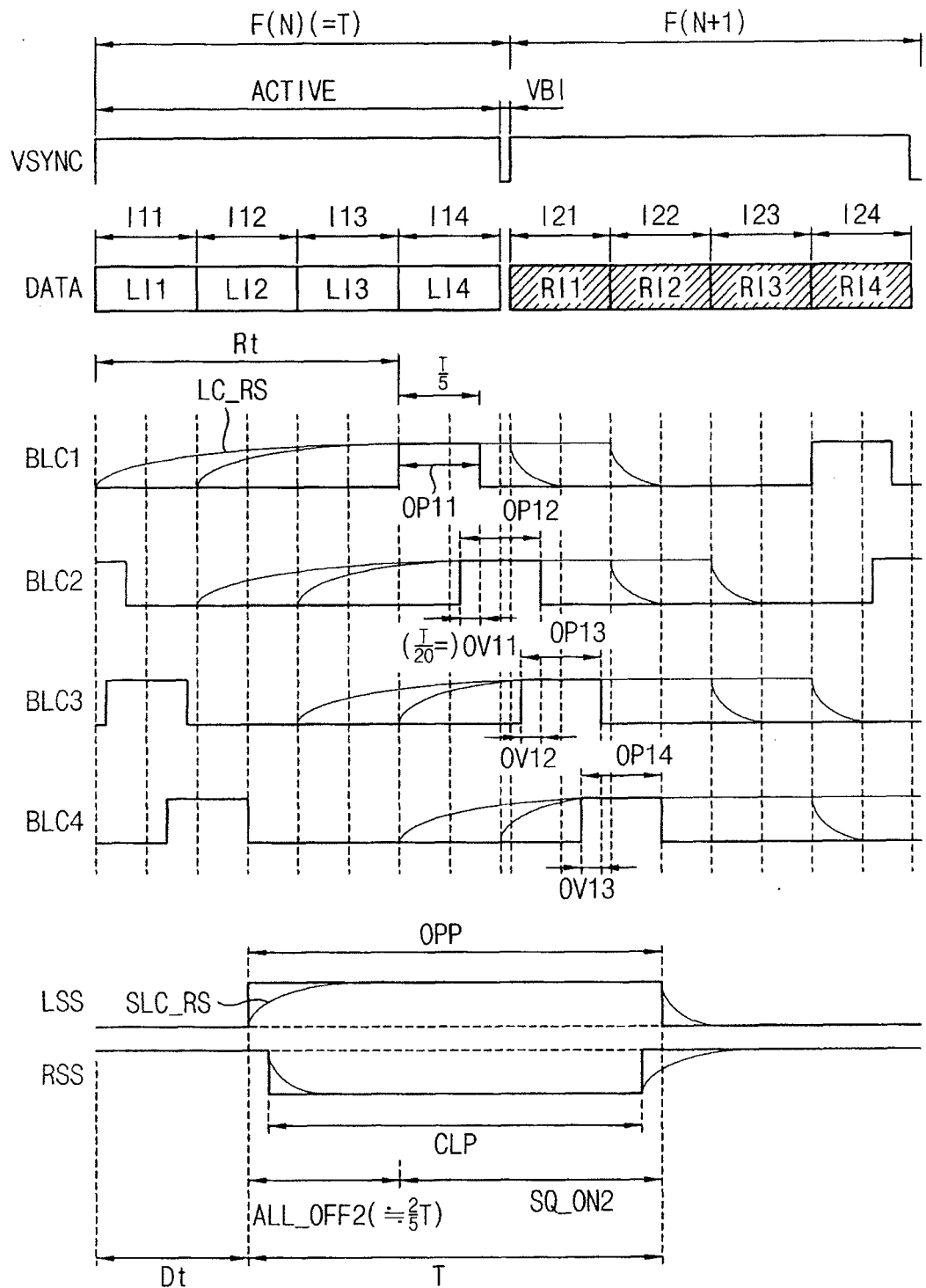
FIG. 14 includes timing diagrams illustrating an example of a method for displaying a stereoscopic image using the display apparatus of FIG. 12.

FIG. 14 includes timing diagrams illustrating a second example of a method for displaying a stereoscopic image by the display apparatus of FIG. 12.

Referring to FIGS. 12 and 14, the panel driving part 200 outputs left-eye data frames LI1, LI2, LI3 and LI4 to the display panel 100 during an N-th frame F(N), and outputs right-eye data frames RI1, RI2, RI3 and RI4 during an (N+1)-th frame F(N+1), as shown in FIG. 13.

The light source driving part 500 sequentially drives the first to fourth light-emitting blocks 450a, 450b, 450c and 450d after a set time Rt. The set time Rt follows a starting point of one frame and takes into consideration a driving margin time of the display panel 100 which is influenced by a response speed of a liquid crystal.

The first light-emitting block 450a is turned on or turned off in response to the first light-emitting control signal BLC1. The first light-emitting control signal BLC1 has a first light-emitting interval OP11. The first light-emitting interval OP11 is started after the set time Rt has elapsed. This point is a start point of an N-th frame F(N) and is influenced by a response speed of a liquid crystal of the display panel 100. The first light-emitting block 450a emits light during the light-emitting interval OP11 from a time in which an outputting of the last line data of the third left-eye data block LI3 is completed, in response to the first light-emitting control signal BLC1. The first light-emitting interval OP11 may be approximately ⅕ of the frame period T. As a result, the first light-emitting block 450a emits light during an interval in which the first left-eye block image is completed on and within which the first display block DB1 is maintained.

The second light-emitting block 450b is turned on or turned off in response to the second light-emitting control signal BLC2. The second light-emitting control signal BLC2 has a second light-emitting interval OP12. The second light-emitting interval OP12 has a first overlap interval OV1 which at least partially overlaps the first light-emitting interval OP11. The fourth overlap interval OV1 may be approximately ¼ of the first light-remitting interval OP11. The second light-emitting block 450b is turned on during the first light-emitting interval OP11 and during the first overlap interval OV1 in response to the second light-emitting control signal BLC2. Light is thereby emitted during the second light-emitting interval OP12. The second light-emitting interval OP12 may be approximately ⅕ of the frame period T. During the second light-emitting interval OP12, a second left-eye block image corresponding to the second left-eye data block L12 is completed on the second display block DB2. As a result, the second light-emitting block 450b emits light during an interval in which the second left-eye block image is completed at and within which the second display block DB2 is maintained.

The first overlap interval OV11 may be set in various manners. For example, in accordance with the response speed of a liquid crystal, the first overlap interval OV11 may be set within a period from a time that the second left-eye block image is completed on the second display block DB2 of the first light-emitting interval OP11 to a time that the first light-emitting interval OP11 is ended. The first overlap interval OV11 may be approximately 1/20 of the frame period T.

The third light-emitting block 450c is turned on or turned off in response to the third light-emitting control signal BLC3. The third light-emitting control signal BLC3 has a third light-emitting interval OP13. The third light-emitting interval OP13 has a second overlap interval OV12 which at least partially overlapping the second light-emitting interval OP12. The second overlap interval OV12 may be approximately 1/20 of the frame period T. The third light-emitting block 450c is turned on during the second light-emitting interval OP12 corresponding to the second overlap interval OV12 in response to the third light-emitting control signal BLC3. The third light-emitting block 450c emits light during the third light-emitting interval OP13. The third light-emitting interval OP13 may be approximately ⅕ of the frame period T. During the third light-emitting interval OP13, a third left-eye block image corresponding to the third left-eye data block L13 is completed on the third display block DB3. As a result, the third light-emitting block 450c emits light during an interval in which the third left-eye block image is completed and within which the third display block DB3 is maintained.

The second overlap interval OV12 may be set in various manners. For example, in accordance with the response speed of a liquid crystal, the second overlap interval OV12 may be set within a period of time from the time the third left-eye block image is completed on the third display block DB3 of the second light-emitting interval OP12 to a time that the second light-emitting interval OP11 is ended.

The fourth light-emitting block 450d is turned on or turned off in response to the fourth light-emitting control signal BLC4. The fourth light-emitting control signal BLC4 has a fourth light-emitting interval OP14. The fourth light-emitting interval OP14 has a third overlap interval OV13 which at least partially overlaps the third light-emitting interval OP13. The third overlap interval OV13 may be approximately 1/20 of the frame period T. The fourth light-emitting block 450d is turned on during the third light-emitting interval OP13 corresponding to the third overlap interval OV13 in response to the fourth light-emitting control signal BLC4. The fourth light-emitting block 450d emits light during the fourth light-emitting interval OP14. The fourth light-emitting interval OP14 may be approximately ⅕ of the frame period T. During the fourth light-emitting interval OP14, a fourth left-eye block image corresponding to the fourth left-eye data block L14 is completed on the fourth display block DB4. As a result, the fourth light-emitting block 450d emits light during an interval in which the fourth left-eye block image is completed at and within which the fourth display block DB4 is maintained.

The third overlap interval OV13 may be set in various manners. For example, in accordance with the response speed of a liquid crystal, the third overlap interval OV13 may be set within a period of time from a time that the fourth left-eye block image is completed on the fourth display block DB4 of the third light-emitting interval OP31 to a time that the third light-emitting interval OP13 is ended. Moreover, the first, second and third overlap intervals OV11, OV12 and OV13 may be set in different manners.

As shown in FIG. 14, the light source part 450 has a delay difference Dt for a start point of the N-th frame F(N) and repeats an operation in the frame period T. An operation period of the light source part 450 has a sequential on interval SQON2 corresponding to approximately 3T/5 interval within which the first to fourth light-emitting blocks 450a, 450b, 450c and 450d sequentially emit light, and the operation period of the light source part 450 also has an all off interval ALL_OFF2 within which the first to fourth light-emitting blocks 450a, 450b, 450c and 450d are turned off for approximately 2T/5 interval before the first light-emitting block 450a emits light due to the first, second and third overlap intervals OV11, OV12 and OV13.

Opening and closing operations of the left-eye shutter 610 and the right-eye shutter 620 are activated within the all off interval ALL_OFF2. A liquid crystal margin time may be determined according to a response speed of a liquid crystal SLC_RS of the left-eye shutter 610 and the right-eye shutter 620. As such, the left-eye shutter 610 and the right-eye shutter 620 are fully opened and closed during an interval in which the left-eye image (or the right-eye image) is substantially maintained, and accordingly, 3D crosstalk may be reduced or prevented. The all off interval ALL_OFF2 may be greater than the response speed of a liquid crystal SLC_RS of the shutter glasses 600. The all off interval ALL_OFF2 may determine the liquid crystal driving time of the shutter glasses 600.

Accordingly, crosstalk between the left-eye image and the right-eye image due to a response speed of a liquid crystal SLC_RS of the shutter glasses 600 may be reduced or eliminated.

Figure 15:
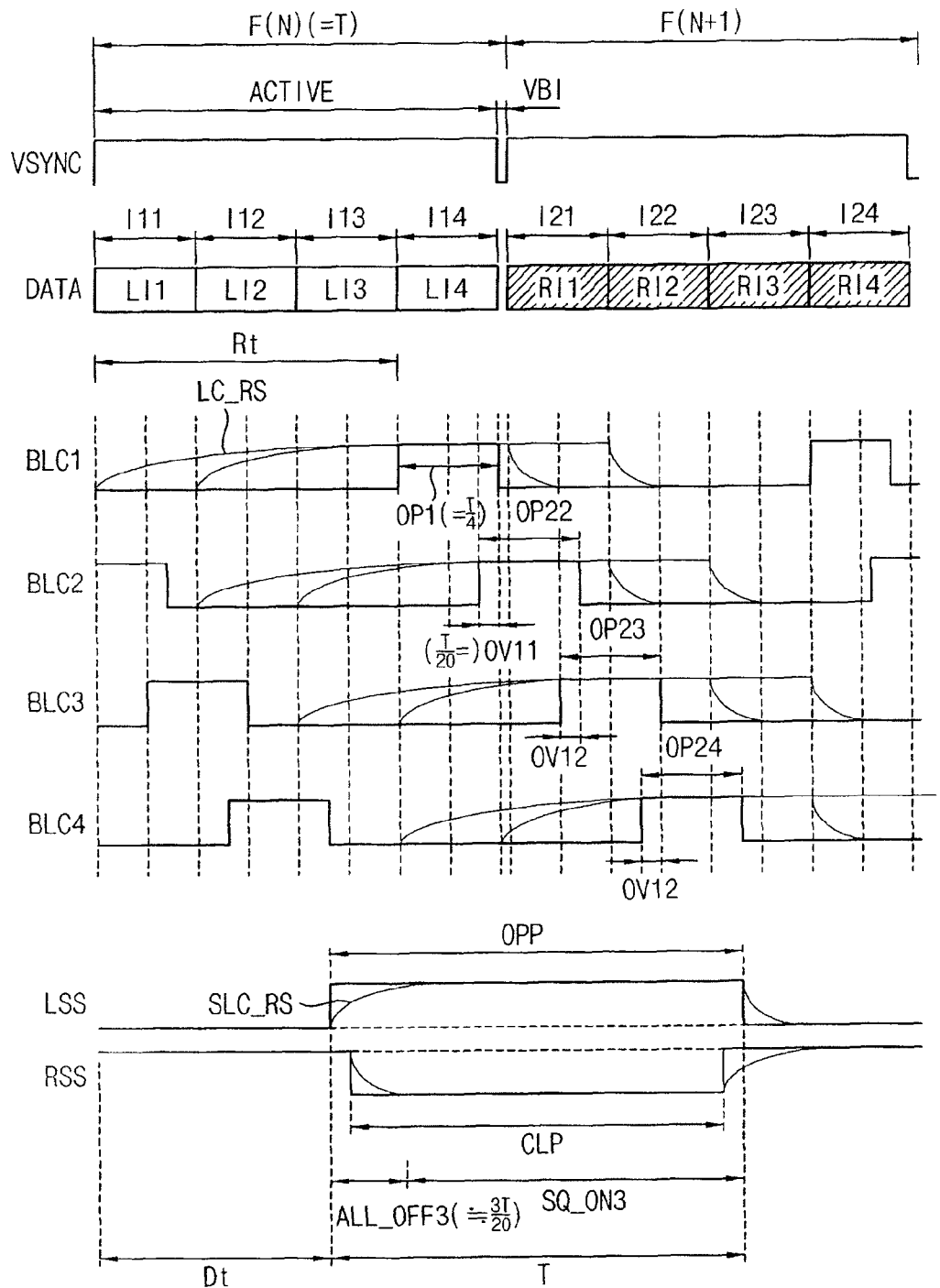
FIG. 15 includes timing diagrams illustrating an example of a method for displaying a stereoscopic image using the display apparatus of FIG. 12.

FIG. 15 includes timing diagrams illustrating a method for displaying a stereoscopic image using the display apparatus of FIG. 12 according to an exemplary embodiment of the present invention.

Referring to FIGS. 12 and 15, the panel driving part 200 outputs left-eye data frames LI1, LI2, LI3 and LI4 to the display panel 100 during an N-th frame F(N), and outputs right-eye data frames RI1, RI2, RI3 and RI4 during an (N+1)-th frame F(N+1), as shown in FIG. 13.

The light source driving part 500 sequentially drives the first to fourth light-emitting blocks 450a, 450b, 450c and 450d after a set time Rt is elapsed with respect to a starting point of one frame. A driving margin time of the display panel 100 that is influenced by a response speed of a liquid crystal LC_RS may also be used to determine the timing of the light source driving part 500.

Here, each of the first, second, third and fourth light-emitting intervals OP21, OP22, OP23 and OP24 may be greater than the first, second, third and fourth light-emitting intervals OP11, OP12, OP13 and OP14, respectively, of FIG. 14.

The first light-emitting interval OP21 of the first light-emitting control signal BLC1 occurs after the set time Rt is elapsed as measured from a start point of the N-th frame F(N). The first light-emitting block 450a emits light during the first light-emitting interval OP21 after the set time Rt in response to the first light-emitting control signal BLC1. The first light-emitting interval OP21 may be approximately ¼ of a frame period T.

The second light-emitting block 450b is turned on or turned off in response to the second light-emitting control signal BLC2. The second light-emitting control signal BLC2 has a second light-emitting interval OP22. The second light-emitting interval OP22 has a first overlap interval OV21 which at least partially overlaps the first light-emitting interval OP1. The first overlap interval OV11 may be approximately 1/20 of the frame period T. The first overlap interval OV21 may be set in various manners. For example, the first overlap interval OV21 may be set in accordance with the response speed of a liquid crystal within a period of time from the time that the second left-eye block image is completed on the second display block DB2 of the first light-emitting interval OP21 to a time that the first light-emitting interval OP21 is ended.

The third light-emitting control signal BLC3 has a third light-emitting interval OP23. The third light-emitting interval OP23 has a second overlap interval OV12 at least partially overlapping the second light-emitting interval OP22. The second overlap interval OV12 may be approximately 1/20 of the frame period T. The second overlap interval OV12 may be set in various manners. For example, in accordance with the response speed of a liquid crystal, the second overlap interval OV12 may be set within a period of time from the time that the third left-eye block image is completed on the third display block DB3 of the second light-emitting interval OP22 to a time that the second light-emitting interval OP22 is ended.

The fourth light-emitting control signal BLC4 has a fourth light-emitting interval OP24. The fourth light-emitting interval OP24 has a third overlap interval OV13 at least partially overlapping the third light-emitting interval OP23. The third overlap interval OV13 may be approximately 1/20 of the frame period T. The third overlap interval OV13 may be set in various manners. For example, in accordance with the response speed of a liquid crystal, the third overlap interval OV23 may be set within a period of time from the time that the fourth left-eye block image is completed on the fourth display block DB4 of the third light-emitting interval OP23 to a time that the third light-emitting interval OP23 is ended. Moreover, the first, second and third overlap intervals OV11, OV12 and OV13 may be set in different manners.

As shown in FIG. 15, the light source part 450 has a delay difference Dt for a start point of the N-th frame F(N) and repeats an operation in the frame period T. An operation period of the light source part 450 has a sequential on interval SQON3 corresponding to approximately 17T/20 interval within which the first to fourth light-emitting blocks 450a, 450b, 450c and 450d sequentially emit light, and the operation period of the light source part 450 also has an all off interval ALL_OFF3 within which the first to fourth light-emitting blocks 450a, 450b, 450c and 450d are turned off for approximately 3T/20 interval before the first light-emitting block 450a emits light due to the first, second and third overlap intervals OV21, OV22 and OV23.

An opening and closing operation of the left-eye shutter 610 and the right-eye shutter 620 is started within the all off interval ALL_OFF3, and accordingly a liquid crystal margin time may be determined according to a response speed of a liquid crystal SLC_RS of the left-eye shutter 610 and the right-eye shutter 620. The all off interval ALL_OFF3 may be greater than the response speed of a liquid crystal SLC_RS of the shutter glasses 600. Thus, the left-eye shutter 610 and the right-eye shutter 620 are fully opened and closed (or closed and opened) in an interval in which the left-eye image (or the right-eye image) is substantially maintained. Accordingly, 3D crosstalk may be reduced or prevented.

Therefore, crosstalk between the left-eye image and the right-eye image due to a response speed of a liquid crystal SLC_RS of the shutter glasses 600 may be reduced or prevented. Moreover, the light-emitting interval may be greater than that described above with reference FIGS. 13 and 14, and luminance characteristics may be increased.

Figure 16:
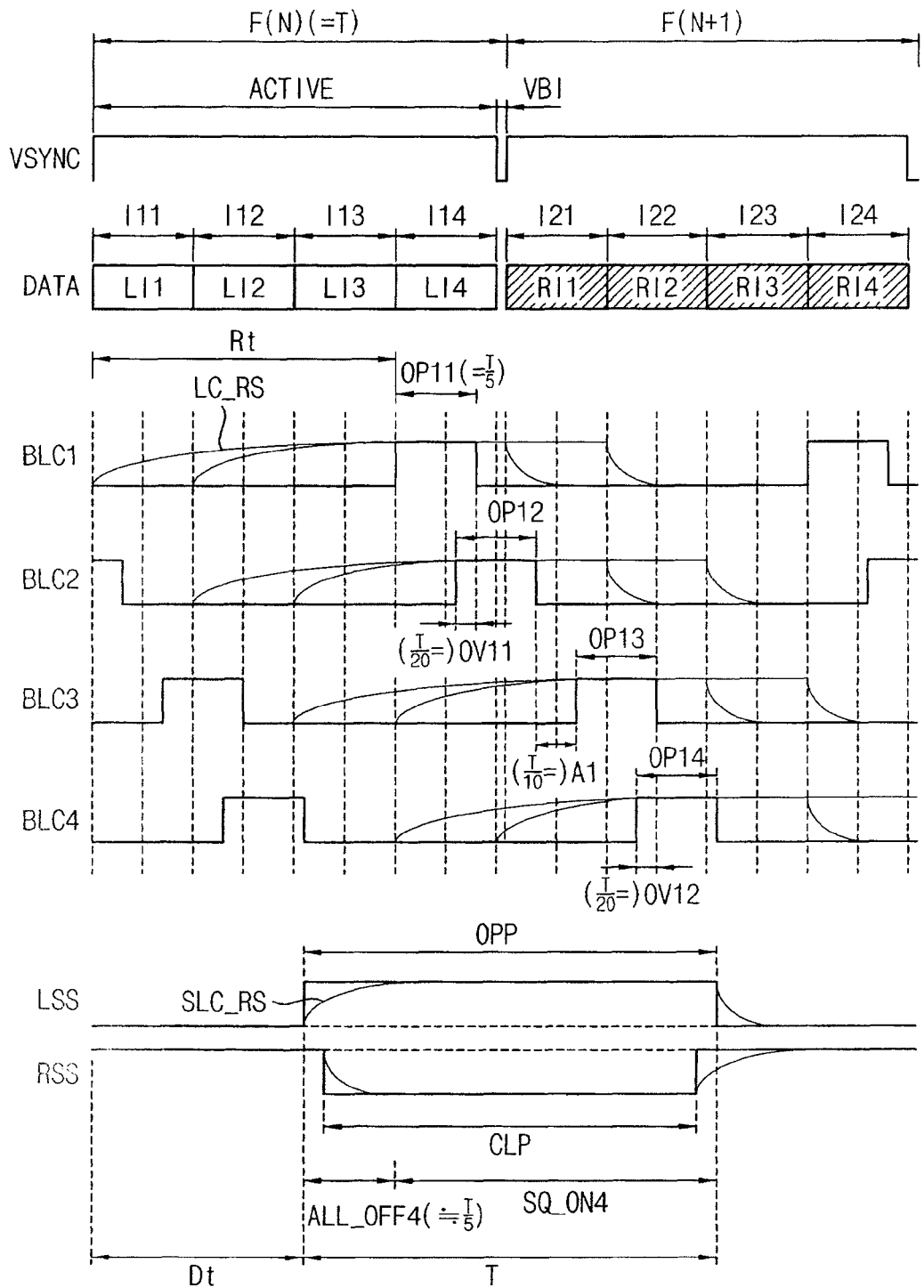
FIG. 16 includes timing diagrams illustrating an example of a method for displaying a stereoscopic image using the display apparatus of FIG. 12.

FIG. 16 includes timing diagrams illustrating a method for displaying a stereoscopic image using the display apparatus of FIG. 12 according to an exemplary embodiment of the present invention.

Referring to FIGS. 12 and 16, the panel driving part 200 outputs left-eye data frames LI1, LI2, LI3 and LI4 to the display panel 100 during an N-th frame F(N), and outputs right-eye data frames RI1, RI2, RI3 and RI4 during an (N+1)-th frame F(N+1), as shown in FIG. 13.

The light source driving part 500 generates first, second, third and fourth light-emitting control signals BLC1, BLC2, BLC3 and BLC4 and drives the light source part 450 including the first to fourth light-emitting blocks 450a, 450b, 450c and 450d, respectively.

The first light-emitting block 450a is turned on or turned off in response to the first light-emitting control signal BLC1. The first light-emitting control signal BLC1 has a first light-emitting interval OP11. The first light-emitting interval OP11 is started from an interval in which the set time Rt has elapsed from a start point of an N-th frame F(N) in accordance with a response speed of a liquid crystal of the display panel 100. The set time Rt may be approximately ¾ of the frame period T. The first light-emitting interval OP11 may be approximately ⅕ of the frame period T.

As shown in FIG. 16, the first light-emitting block 450a emits light during the first light-emitting interval OP11 from a time in which an outputting of the last line data of the third left-eye data block LI3 is completed, in response to the first light-emitting control signal BLC1. During the first light-emitting interval OP11, a first left-eye block image corresponding to the first left-eye data block LI1 is completed on the first display block DB1. As a result, the first light-emitting block 450a emits light during an interval in which the first left-eye block image is completed and within which the first display block DB1 is maintained.

The second light-emitting block 450b is turned on or turned off in response to the second light-emitting control signal BLC2. The second light-emitting control signal BLC2 has a second light-emitting interval OP12. The second light-emitting interval OP12 has a first overlap interval OV11 at least partially overlapping the first light-emitting interval OP11. The first overlap interval OV11 may be approximately 1/20 of the frame period T. The second light-emitting block 450b is turned on during the first light-emitting interval OP11 corresponding to the first overlap interval OV1 in response to the second light-emitting control signal BLC2. The second light-emitting block 450b emits light during the second light-emitting interval OP12. The second light-emitting interval OP12 may be approximately 1/5 of the frame period T. During the second light-emitting interval OP12, a second left-eye block image corresponding to the second left-eye data block L12 is completed on the second display block DB2. As a result, the second light-emitting block 450b emits light during an interval in which the second left-eye block image is completed and within which the second display block DB2 is maintained.

The first overlap interval OV11 may be set in various manners. For example, in accordance with the response speed of a liquid crystal, the first overlap interval OV11 may be set within a period of time from a time that the second left-eye block image is completed on the second display block DB2 of the first light-emitting interval OP11 to a time that the first light-emitting interval OP11 is ended.

The third light-emitting block 450c is turned on or turned off in response to the third light-emitting control signal BLC3. The third light-emitting control signal BLC3 has a third light-emitting interval OP13. The third light-emitting interval OP13 is started after the second light-emitting interval OP12 by approximately an interval A1. The interval A1 may be approximately 1/10 of the frame period T. The third light-emitting block 450c emits light during a period of time from the interval A1 to the third light-emitting interval OP13 in response to the third light-emitting control signal BLC3. For example, the light source part 450 does not emit light during the interval A1. The third light-emitting interval OP13 may be approximately 1/5 of the frame period T. During the third light-emitting interval OP13, a third left-eye block image corresponding to the third left-eye data block L13 is completed on the third display block DB3. As a result, the third light-emitting block 450c emits light during an interval in which the third left-eye block image is completed and within which the third display block DB3 is maintained.

The fourth light-emitting block 450d is turned on or turned off in response to the fourth light-emitting control signal BLC4. The fourth light-emitting control signal BLC4 has a fourth light-emitting interval OP14. The fourth light-emitting interval OP14 has a third overlap interval OV13 which at least partially overlaps the third light-emitting interval OP13. The second overlap interval OV12 may be approximately 1/20 of the frame period T. The fourth light-emitting block 450d is turned on during the third light-emitting interval OP13 corresponding to the second overlap interval OV12 in response to the fourth light-emitting control signal BLC4. The fourth light emitting block 450d emits light during the fourth light-emitting interval OP14. The fourth light-emitting interval OP14 may be approximately 1/5 of the frame period T. During the fourth light-emitting interval OP14, a fourth left-eye block image corresponding to the fourth left-eye data block L14 is completed on the fourth display block DB4. As a result, the fourth light-emitting block 450d emits light during an interval in which the fourth left-eye block image is completed and within which the fourth display block DB4 is maintained.

The interval A1 may be set in various manners and may depend upon an interval in which the third left-eye block image is maintained within on the third display block DB3 in accordance with the response speed of a liquid crystal and the first and second overlap intervals OV11 and OV12. The first overlap interval OV11 may be different from the second overlap interval OV12.

As shown in FIG. 16, the light source part 450 has a delay difference Dt for a start point of the N-th frame F(N) and repeats an operation in the frame period T. An operation period of the light source part 450 has a sequential on interval SQ_ON4 and an all off interval ALL_OFF.

During a sequence on interval SQ_ON4 corresponding to approximately 4T/5, the second light-emitting block 450b at least partially overlaps the first light-emitting block 450a to sequentially emit light. The third light-emitting block 450c emits light after the interval A1. The fourth light-emitting block 450d at least partially overlaps the third light-emitting block 450c corresponding to the second overlap interval OV12. During the all off interval ALL_OFF4 corresponding to approximately T/5 interval before the first light-emitting block 450a emits light, the first, second, third and fourth light-emitting blocks 450a, 450b, 450c and 450d are turned off.

Opening and closing operations of the left-eye shutter 610 and the right-eye shutter 620 are activated within the all off interval ALL_OFF4. A liquid crystal margin time may be determined according to a response speed of a liquid crystal SLC_RS of the left-eye shutter 610 and the right-eye shutter 620. The all off interval ALL_OFF4 may be greater than the response speed of a liquid crystal SLC_RS of the shutter glasses 600. As such, the left-eye shutter 610 and the right-eye shutter 620 are fully opened and closed (or closed and opened) in an interval in which the left-eye image (or the right-eye image) is substantially maintained. Accordingly, 3D crosstalk may be reduced or prevented.

3D crosstalk and luminance uniformity may be increased by preventing or reducing a measure of light leakage generated at adjacent light-emitting blocks. For example, when the second light-emitting block 450b emits light, the second light-emitting block 450b provides the second display block DB2 with light and may inadvertently provide the first and third display blocks DB1 and DB3 adjacent to the second display block DB2 with leakage light of the second light block 450b. Because of this crossing over of light into the wrong display block, 3D crosstalk may be perceived on the first and third display blocks DB1 and DB3 and the first and third display blocks DB1 and DB3 may have a high luminance that may come at the expense of the luminance of the second display block DB2. According to an exemplary embodiment, the interval A1 that the light-emitting blocks are turned off is positioned in a middle of intervals that the light-emitting blocks are sequentially turned off, so that 3D crosstalk and luminance uniformity caused by leakage light generated at adjacent light-emitting blocks may be increased.

Figure 17:
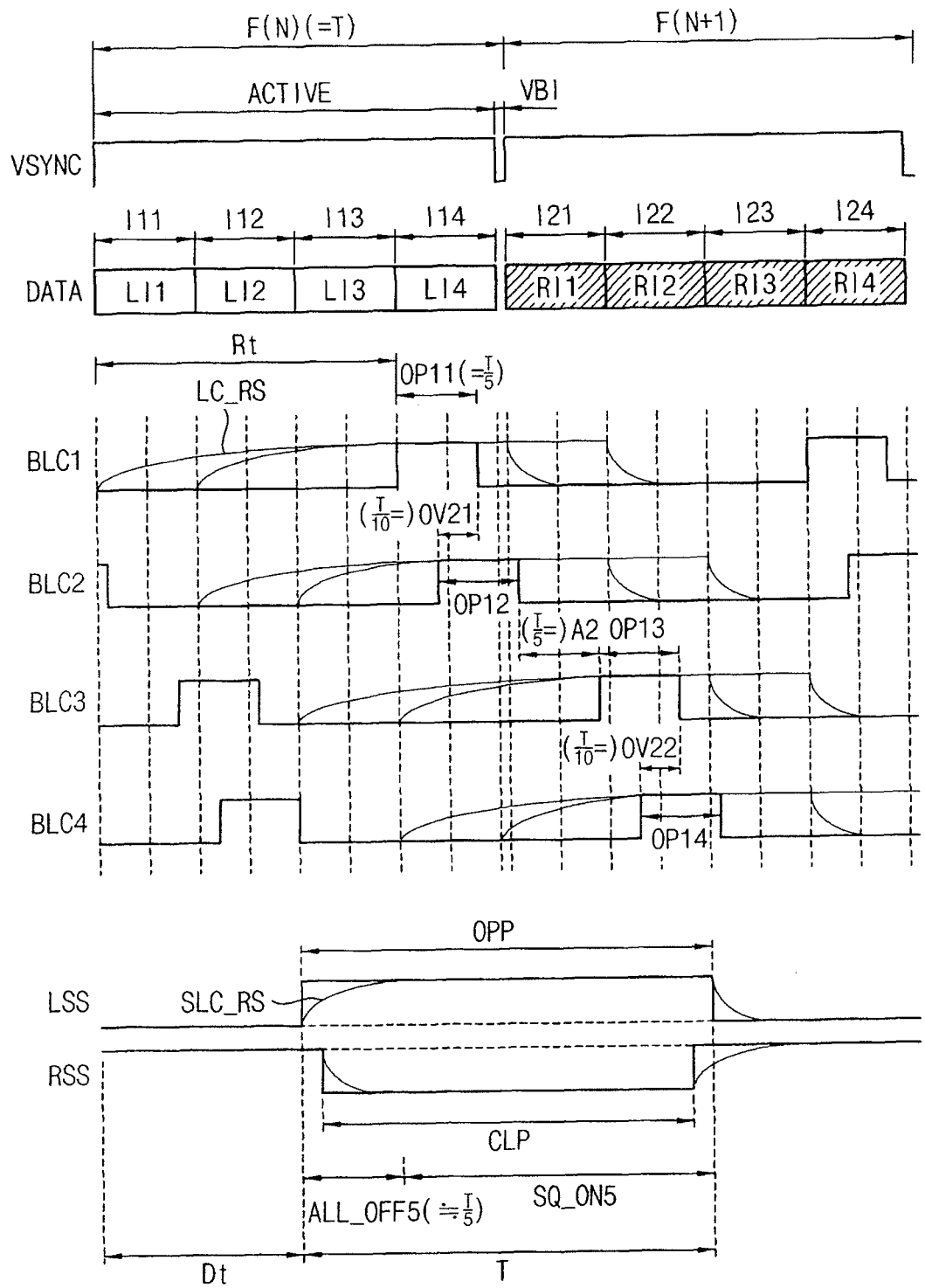
FIG. 17 includes timing diagrams illustrating an example of a method for displaying a stereoscopic image using the display apparatus of FIG. 12.

FIG. 17 includes timing diagrams illustrating an example of a method for displaying a stereoscopic image using the display apparatus of FIG. 12.

Referring to FIGS. 12 and 17, the panel driving part 200 outputs left-eye data frames LI1, LI2, LI3 and LI4 to the display panel 100 during an N-th frame F(N) and outputs right-eye data frames RI1, RI2, RI3 and RI4 during an (N+1)-th frame F(N+1), as shown in FIG. 13.

The light source driving part 500 generates first, second, third and fourth light-emitting control signals BLC1, BLC2, BLC3 and BLC4 and these control signals are used to drive the light source part 450, for example, the first to fourth light-emitting blocks 450*a*, 450*b*, 450*c* and 450*d*, respectively.

The first light-emitting control signal BLC1 has a first light-emitting interval OP11. The first light-emitting interval OP11 starts from an interval in which the set time Rt is elapsed after a start point of an N-th frame F(N), in accordance with a response speed of a liquid crystal of the display panel 100. The set time Rt may be approximately ¾ of the frame period T. The first light-emitting interval OP11 may be approximately ⅕ of the frame period T.

The second light-emitting control signal BLC2 has a second light-emitting interval OP12. The second light-emitting interval OP12 has a first overlap interval OV21 which at least partially overlaps the first light-emitting interval OP11. The first overlap interval OV21 may be greater than the first overlap interval OV11 of FIG. 16. For example, the first overlap interval OV21 may be approximately 1/10 of the frame period T.

The third light-emitting control signal 450*c* has a third light-emitting interval OP13 spaced from the second light-emitting interval OP12 by approximately an interval A2. The interval A2 may be greater than the interval A1 of FIG. 16. For example, the interval A2 may be approximately ⅕ of the frame period T.

The fourth light-emitting control signal BLC4 has a fourth light-emitting interval OP14. The fourth light-emitting interval OP14 has a second overlap interval OV22 which at least partially overlaps the third light-emitting interval OP13. The second overlap interval OV22 may be greater than the second overlap interval OV12 of FIG. 16. For example, the second overlap interval OV22 may be approximately ½ of the third light-emitting interval OP13.

Accordingly, the first and second overlap intervals OV21 and OV22 are increased, so that the interval A2 may be increased. The interval A2 may be set in various manners and may depend upon an interval in which the third left-eye block image is maintained on the third display block DB3 in accordance with the response speed of a liquid crystal and the first and second overlap intervals OV11 and OV12.

As shown in FIG. 17, the light source part 450 has a delay difference Dt for a start point of the N-th frame F(N) and repeats an operation in the frame period T. An operation period of the light source part 450 has a sequential on interval SQ_ON5 and an all off interval ALL_OFF5. During the sequential on interval SQ_ON5 corresponding to approximately 4T/5, the second light-emitting block 450*b* at least partially overlaps the first light-emitting block 450*a* for the first overlap interval OV21 to sequentially emit light, and the third light-emitting block 450*c* emits light after the interval A4. The fourth light-emitting block 450*d* at least partially overlaps the third light-emitting block 340*c* for the second overlap interval OV22 to sequentially emit light. During the all off interval ALL_OFF5 corresponding to approximately T/5 before the first light-emitting block 450 emits light, the first to fourth light-emitting blocks 450*a*, 450*b*, 450*c* and 450*d* are turned off.

Opening and closing operations of the left-eye shutter 610 and the right-eye shutter 620 are activated within the all off interval ALL_OFF5. A liquid crystal margin time may be determined according to a response speed of a liquid crystal SLC_RS of the left-eye shutter 610 and the right-eye shutter 620. The all off interval ALL_OFF5 may be greater than the response speed of a liquid crystal SLC_RS of the shutter glasses 600. The left-eye shutter 610 is fully opened and the right-eye shutter 620 is fully closed within the all off interval ALL_OFF8, so that the left-eye image may be viewed through the shutter glasses 600 in an interval in which the left-eye image is substantially maintained.

The interval A2 is greater than that of FIG. 16 by using the first and second overlap intervals OV21 and OV22, so that 3D crosstalk may be reduced or eliminated while luminance and uniformity may be increased by preventing leakage light generated at adjacent light-emitting blocks. Light-emitting intervals of each of light-emitting blocks are substantially equal to each other, so that whole luminance of a display apparatus may be substantially uniform.

Figure 18:
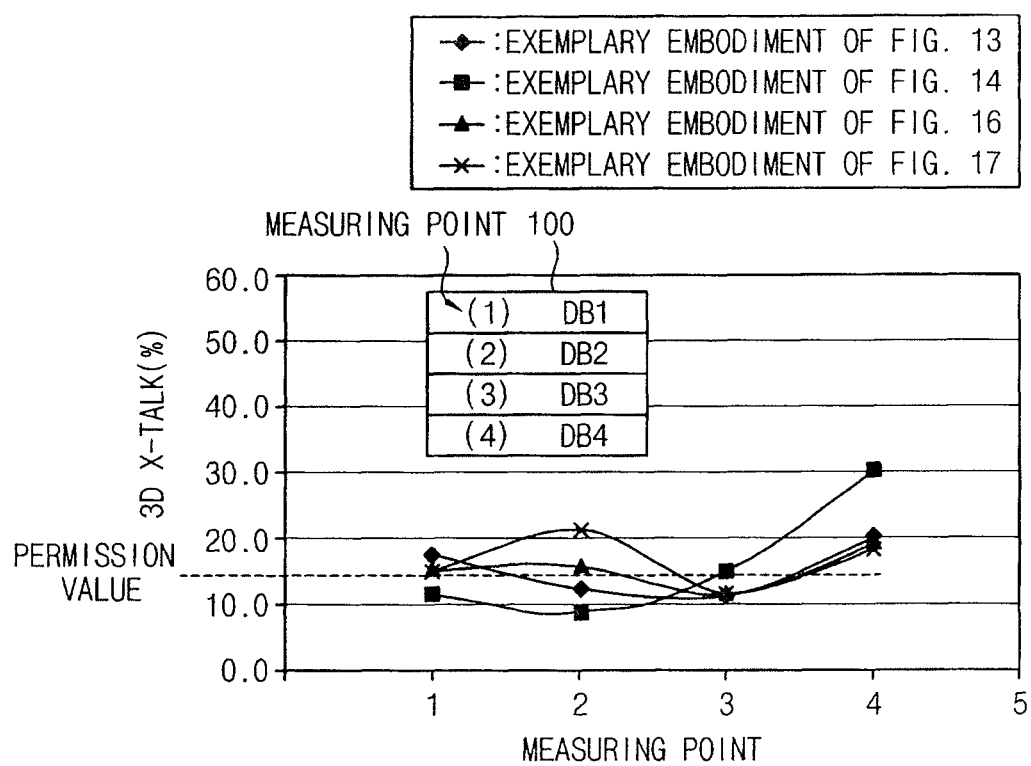
FIG. 18 includes graphs illustrating crosstalk according to exemplary embodiments of the present invention.

FIG. 18 is graphs showing crosstalk values according to exemplary embodiments of the present invention.

Referring to FIGS. 13 to 18, 3D crosstalk values were measured at first, second, third and fourth measuring points 1, 2, 3 and 4 corresponding to first, second, third and fourth display blocks DB1, DB2, DB3 and DB4 of the display panel 100.

According to a stereoscopic image display method of FIG. 13, 3D a crosstalk value of the third measuring point 3 was small, and 3D crosstalk values were increased in a sequence of second, first and fourth measuring points 2, 1 and 4. It is recognized that 3D crosstalk values of the first, second, third and fourth measuring points 1, 2, 3 and 4 were different from each other; however, all of the crosstalk values of the first, second, third and fourth measuring points 1, 2, 3 and 4 were substantially smaller than a permission value which is indicative of a level of acceptable crosstalk.

According to a stereoscopic image display method illustrated in FIG. 14, 3D the crosstalk value of the second measuring point 2 was small, and 3D crosstalk values were increased in a sequence of first, third and fourth measuring points 1, 3 and 4. It is recognized that the 3D crosstalk value of the fourth measuring point 4 was greater than the first to third measuring points 1, 2 and 3; however, the crosstalk values of the first, second and third measuring points 1, 2 and 3 were substantially smaller than a permission value.

According to a stereoscopic image display method of FIG. 16, a 3D crosstalk value of the third measuring point 3 was small, and 3D crosstalk values were increased in a sequence of first, second and fourth measuring points 1, 2 and 4. It is recognized that the 3D crosstalk values of the first, second, third and fourth measuring points 1, 2, 3 and 4 were different from each other; however, all of the crosstalk values of the first, second, third and fourth measuring points 1, 2, 3 and 4 were substantially smaller than a permission value.

According to a stereoscopic image display method illustrated in of FIG. 17, a 3D crosstalk value of the third measuring point 3 was small, and 3D crosstalk values were increased in a sequence of first, fourth and second measuring points 1, 4 and 2. It is recognized that the 3D crosstalk values of the first, second, third and fourth measuring points 1, 2, 3 and 4 were different from each other; however, all of the crosstalk values of the first, second, third and fourth measuring points 1, 2, 3 and 4 were smaller than a permission value.

Accordingly, it is recognized that 3D crosstalk values of the display apparatus according to exemplary embodiment of the present invention have acceptably low crosstalk values.

Figure 19:
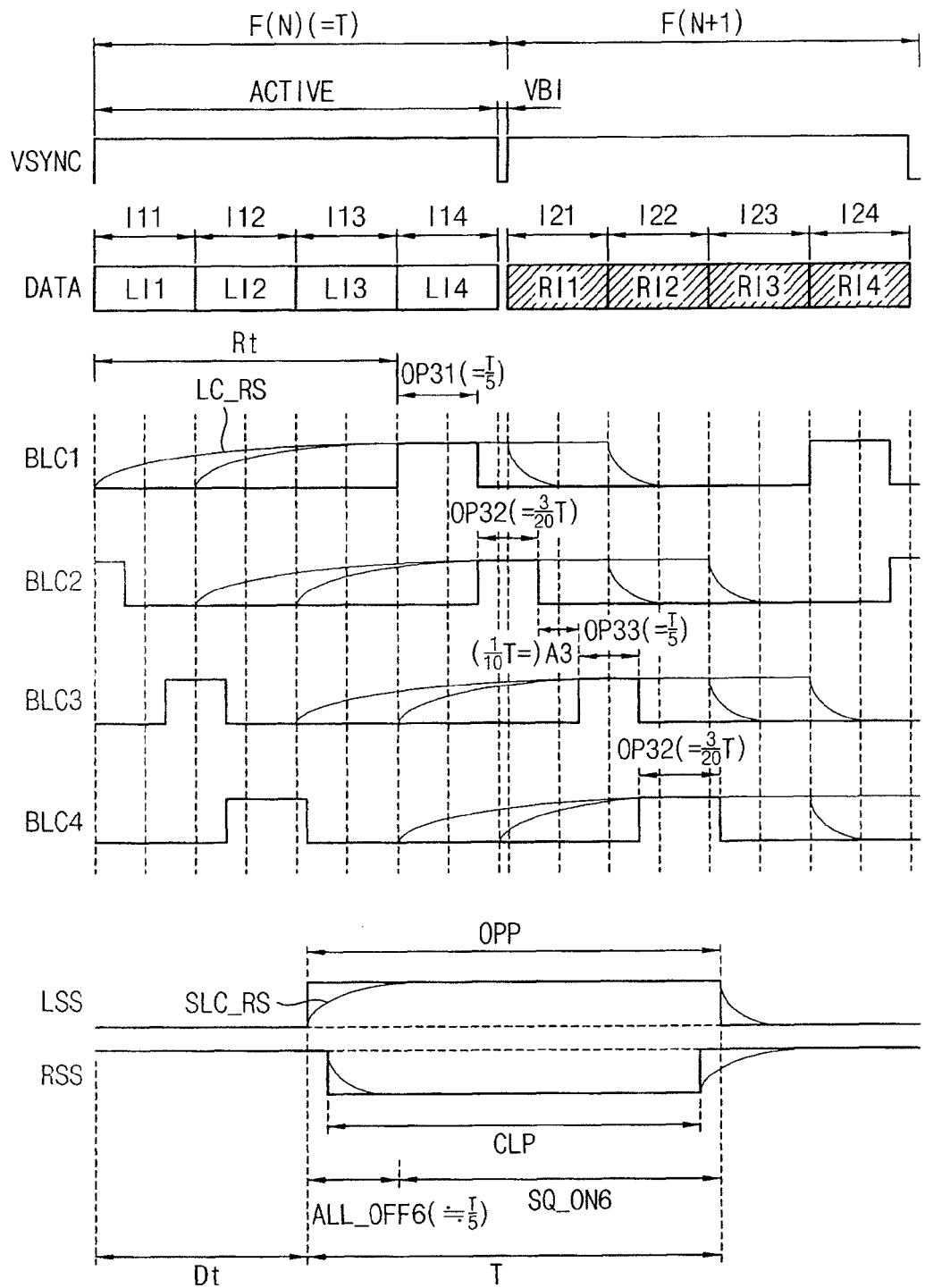
FIG. 19 includes timing diagrams illustrating an example of a method for displaying a stereoscopic image using the display apparatus of FIG. 12.

FIG. 19 includes timing diagrams illustrating an example of a method for displaying a stereoscopic image by the display apparatus of FIG. 12.

Referring to FIGS. 12 and 19, the panel driving part 200 outputs left-eye data frames LI1, LI2, LI3 and LI4 to the display panel 100 during an N-th frame F(N), and outputs right-eye data frames RI1, RI2, RI3 and RI4 during an (N+1)-th frame F(N+1), as shown in FIG. 13.

The light source driving part 500 generates first, second, third and fourth light-emitting control signals BLC1, BLC2, BLC3 and BLC4 and drives the light source part 450; for example, the first to fourth light-emitting blocks 450a, 450b, 450c and 450d, respectively.

The first light-emitting block 450a is turned on or turned off in response to the first light-emitting control signal BLC1. The first light-emitting control signal BLC1 has a first light-emitting interval OP31. The first light-emitting interval OP31 is started from an interval in which the set time Rt is elapsed from a start point of an N-th frame F(N) in accordance with a response speed of a liquid crystal of the display panel 100. The set time Rt may be approximately ¾ of the frame period T. The first light-emitting interval OP31 may be approximately ⅕ of the frame period T.

As shown in FIG. 19, the first light-emitting block 450a emits light during the first light-emitting interval OP31 from a time in which an output of the last line data of the third left-eye data block L13 is completed, in response to the first light-emitting control signal BLC1. During the first light-emitting interval OP31, a first left-eye block image corresponding to the first left-eye data block LI1 is completed on the first display block DB1. As a result, the first light-emitting block 450a emits light during an interval in which the first left-eye block image is completed on and the first display block DB1 to be maintained.

The second light-emitting block 450b is turned on or turned off in response to the second light-emitting control signal BLC2. The second light-emitting control signal BLC2 has a second light-emitting interval OP32. The second light-emitting interval OP32 is positioned after the first light-emitting interval OP31. The second light-emitting block 450b emits light during the second light-emitting interval OP32 in response to the second light-emitting control signal BLC2. The second light-emitting interval OP32 may be approximately 3/20 of the frame period T. During the second light-emitting interval OP32, a second left-eye block image corresponding to the second left-eye data block L12 is completed on the second display block DB2. As a result, the second light-emitting block 450b emits light during an interval in which the second left-eye block image is completed within and the second display block DB2 is maintained.

The third light-emitting block 450c is turned on or turned off in response to the third light-emitting control signal BLC3. The third light-emitting control signal BLC3 has a third light-emitting interval OP33. The third light-emitting interval OP33 is started after the second light-emitting interval OP32 by approximately an interval A3. The interval A3 may be approximately 1/20 of the frame period T. The third light-emitting block 450c emits light during the interval A3 to the third light-emitting interval OP33 in response to the third light-emitting control signal BLC3. For example, the light source part 450 does not emit light during the interval A3. The third light-emitting interval OP33 may be approximately ⅕ of the frame period T. During the third light-emitting interval OP33, a third left-eye block image corresponding to the third left-eye data block L13 is completed on the third display block DB3. As a result, the third light-emitting block 450c emits light during an interval in which the third left-eye block image is completed on and the third display block DB3 is maintained.

The fourth light-emitting block 450d is turned on or turned off in response to the fourth light-emitting control signal BLC4. The fourth light-emitting control signal BLC4 has a fourth light-emitting interval OP34. The fourth light-emitting interval OP34 is positioned after the third light-emitting interval OP33. The fourth light-emitting block 450d emits light during the fourth light-emitting interval OP34 in response to the fourth light-emitting control signal BLC4. The fourth light-emitting interval OP34 may be approximately 3/20 of the frame period T. During the fourth light-emitting interval OP34, a fourth left-eye block image corresponding to the fourth left-eye data block L14 is completed on the fourth display block DB4. As a result, the fourth light-emitting block 450d emits light during an interval in which the fourth left-eye block image is completed within and the fourth display block DB4 is maintained.

The interval A3 may be set in various manners and may depend upon an interval in which the third left-eye block image is maintained on the third display block DB3 in accordance with the response speed of a liquid crystal.

As shown in FIG. 19, the light source part 450 has a delay difference Dt for a start point of the N-th frame F(N) and repeats an operation in the frame period T. An operation period of the light source part 450 has a sequential on interval SQ_ON5 and an all off interval ALL_OFF5. During the sequential on interval SQ_ON6 corresponding to approximately 4T/5, the first and second light-emitting blocks 450a and 450b sequentially emit light, and the third and fourth light-emitting blocks 450c and 450d sequentially emit light after the interval A3. Moreover, during the all off interval ALL_OFF6 corresponding to approximately T/5 before the first light-emitting block 450 emits light, the first to fourth light-emitting blocks 450a, 450b, 450c and 450d are turned off.

Opening and closing operations of the left-eye shutter 610 and the right-eye shutter 620 are activated within the all off interval ALL_OFF6. A liquid crystal margin time may be determined according to a response speed of a liquid crystal SLC_RS of the left-eye shutter 610 and the right-eye shutter 620. The all off interval ALL_OFF6 may be greater than the response speed of a liquid crystal SLC_RS of the shutter glasses 600. As such, the left-eye shutter 610 and the right-eye shutter 620 are fully opened and closed (or closed and opened) in an interval in which the left-eye image (or the right-eye image) is substantially maintained, so that a 3D crosstalk may be reduced or prevented.

Moreover, considering that a falling time is greater than a rising time in accordance with response speed of a liquid crystal of the shutter glasses 600, it realizes that a rising time point of the left-eye signal LSS leads a falling time point of the right-eye shutter signal RSS, so that a driving delay time of the shutter glasses 600 may be decreased. As such, the opening intervals OPP of the left-eye and right-eye shutter signals LSS and RDD may be greater than the closing interval CLP.

Therefore, a crosstalk between the left-eye image and the right-eye image due to a response speed of a liquid crystal SLC_RS of the shutter glasses 600 may be reduced or prevented. Moreover, the interval A1 that the light-emitting blocks are turned off is positioned in a middle of intervals that the light-emitting blocks are sequentially turned off, so that 3D crosstalk may be reduced or eliminated while luminance and uniformity may be increased by preventing leakage light generated at adjacent light-emitting blocks.

Figure 20:
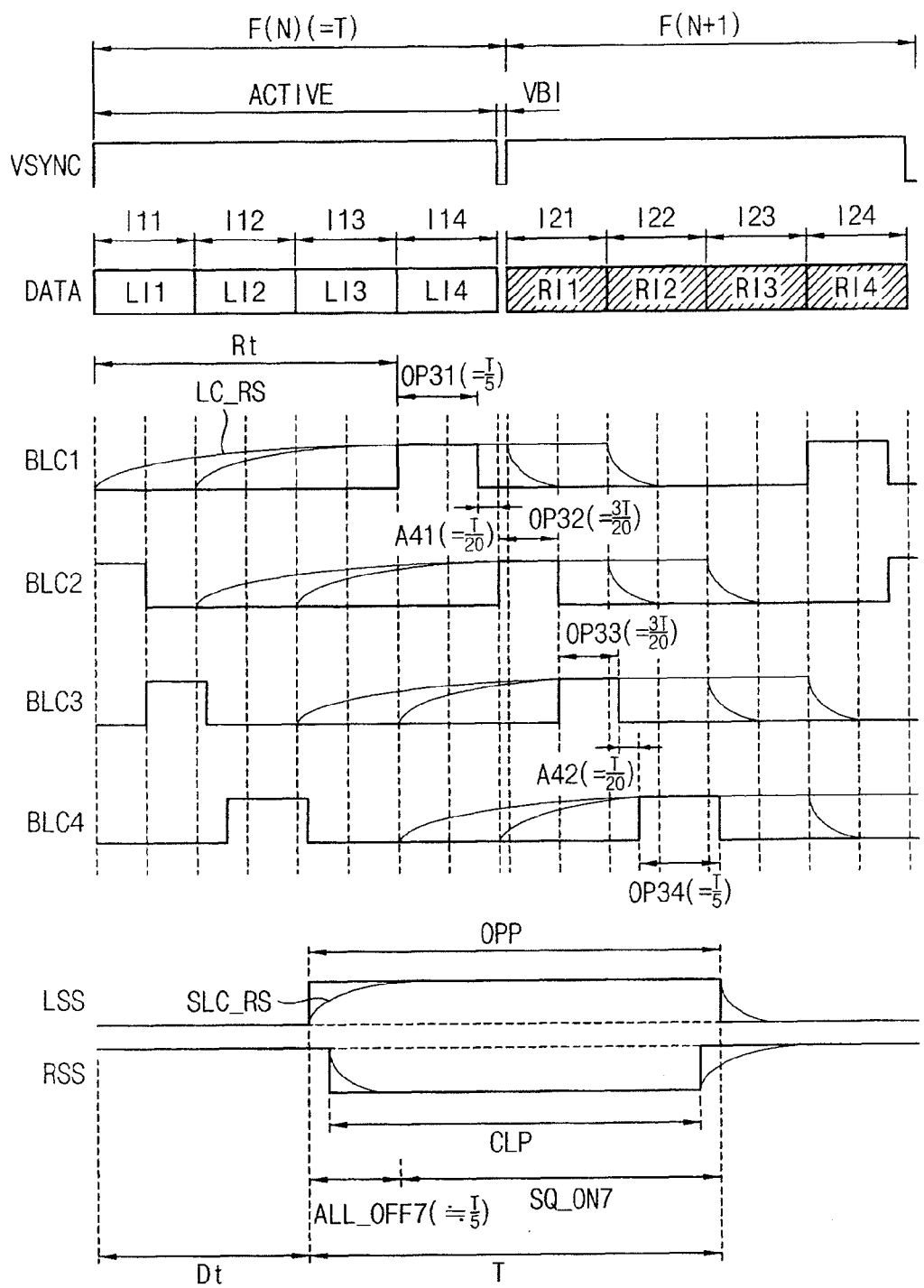
FIG. 20 includes timing diagrams illustrating an example of a method for displaying a stereoscopic image using the display apparatus of FIG. 12.

FIG. 20 is timing diagrams illustrating an example of a method for displaying a stereoscopic image by the display apparatus of FIG. 12.

Referring to FIGS. 12 and 20, the panel driving part 200 outputs left-eye data frames LI1, LI2, LI3 and LI4 to the display panel 100 during an N-th frame F(N), and outputs a right-eye data frame RI1, RI2, RI3 and RI4 to the display panel 100 during an (N+1)-th frame F(N+1).

The light source driving part 500 generates first, second, third and fourth light-emitting control signals BLC1, BLC2, BLC3 and BLC4 and drives the light source part 450, for example, the first to fourth light-emitting blocks 450a, 450b, 450c and 450d.

The first light-emitting block 450a is turned on or turned off in response to the first light-emitting control signal BLC1. The first light-emitting control signal BLC1 has a first light-emitting interval OP31. The first light-emitting interval OP31 is started from an interval in which the set time Rt is elapsed from a start point of an N-th frame F(N) in accordance with a response speed of a liquid crystal of the display panel 100. The set time Rt may be approximately ¾ of the frame period T. The first light-emitting interval OP31 may be approximately ⅕ of the frame period T.

The second light-emitting block 450b is turned on or turned off in response to the second light-emitting control signal BLC2. The second light-emitting control signal BLC2 has a second light-emitting interval OP32. The second light-emitting interval OP32 is started after the first light-emitting interval OP31 by approximately a first interval A41. The first interval A41 may be approximately 1/20 of the frame period T. The second light-emitting interval OP32 may be approximately 3/20 of the frame period T.

The third light-emitting block 450c is turned on or turned off in response to the third light-emitting control signal BLC3. The third light-emitting control signal BLC3 has a third light-emitting interval OP33. The third light-emitting interval OP33 is positioned after the second light-emitting interval OP32. The third light-emitting interval OP33 may be approximately 3/20 of the frame period T.

The fourth light-emitting block 450d is turned on or turned off in response to the fourth light-emitting control signal BLC4. The fourth light-emitting control signal BLC4 has a fourth light-emitting interval OP34. The fourth light-emitting interval OP34 is started after the third light-emitting interval OP33 by approximately a second interval A42. The second interval A42 may be approximately 1/20 of the frame period T. The fourth light-emitting interval OP34 may be approximately ⅕ of the frame period T.

The first interval A41 may be set in various manners and may depend upon an interval in which the second left-eye block image is maintained on the second display block DB2 in accordance with the response speed of a liquid crystal. Moreover, the second interval A42 may be set in various manners and may depend upon an interval in which the second left-eye block image is maintained on the fourth display block DB4 in accordance with the response speed of a liquid crystal.

As shown in FIG. 20, the light source part 450 has a delay difference Dt for a start point of the N-th frame F(N) and repeats an operation in the frame period T. An operation period of the light source part 450 has a sequential on interval SQ_ON7 and an all off interval ALL_OFF7. During the sequential on interval SQ_ON7 corresponding to approximately 4T/5, the second light-emitting block 450b emits light after the first interval A41 after the first light-emitting block 450a emits light, and the third light-emitting block 450 simultaneously emits light after the second light-emitting block 450b emits light. The fourth light-emitting block 450d emits light after the second interval A42 after the third light-emitting block 450c emits light. Thus, luminance uniformity may be increased by reducing or preventing leakage light generated at adjacent light-emitting blocks due to the first and second intervals A41 and A42.

Moreover, during the all off interval ALL_OFF7 corresponding to approximately T/5 interval that before the first light-emitting block 450a emits light, the first, second, third and fourth light-emitting blocks 450a, 450b, 450c and 450d are turned off.

Opening and closing operations of the left-eye shutter 610 and the right-eye shutter 620 are activated within the all off interval ALL_OFF7. A liquid crystal margin time may be determined according to a response speed of a liquid crystal SLC_RS of the left-eye shutter 610 and the right-eye shutter 620. The all off interval ALL_OFF7 may be greater than the response speed of a liquid crystal SLC_RS of the shutter glasses 600. As such, the left-eye shutter 610 and the right-eye shutter 620 are fully opened and closed (or closed and opened) in an interval in which the left-eye image (or the right-eye image) is substantially maintained, so that a 3D crosstalk may be reduced or prevented.

Therefore, crosstalk between the left-eye image and the right-eye image due to a response speed of a liquid crystal SLC_RS of the shutter glasses 600 may be reduced or prevented. Moreover, the first and second intervals A41 and A42 are between the light-emitting intervals, so that 3D crosstalk may be reduced or eliminated while luminance and uniformity may be increased by reducing or preventing leakage light generated at adjacent light-emitting blocks.

Figure 21:
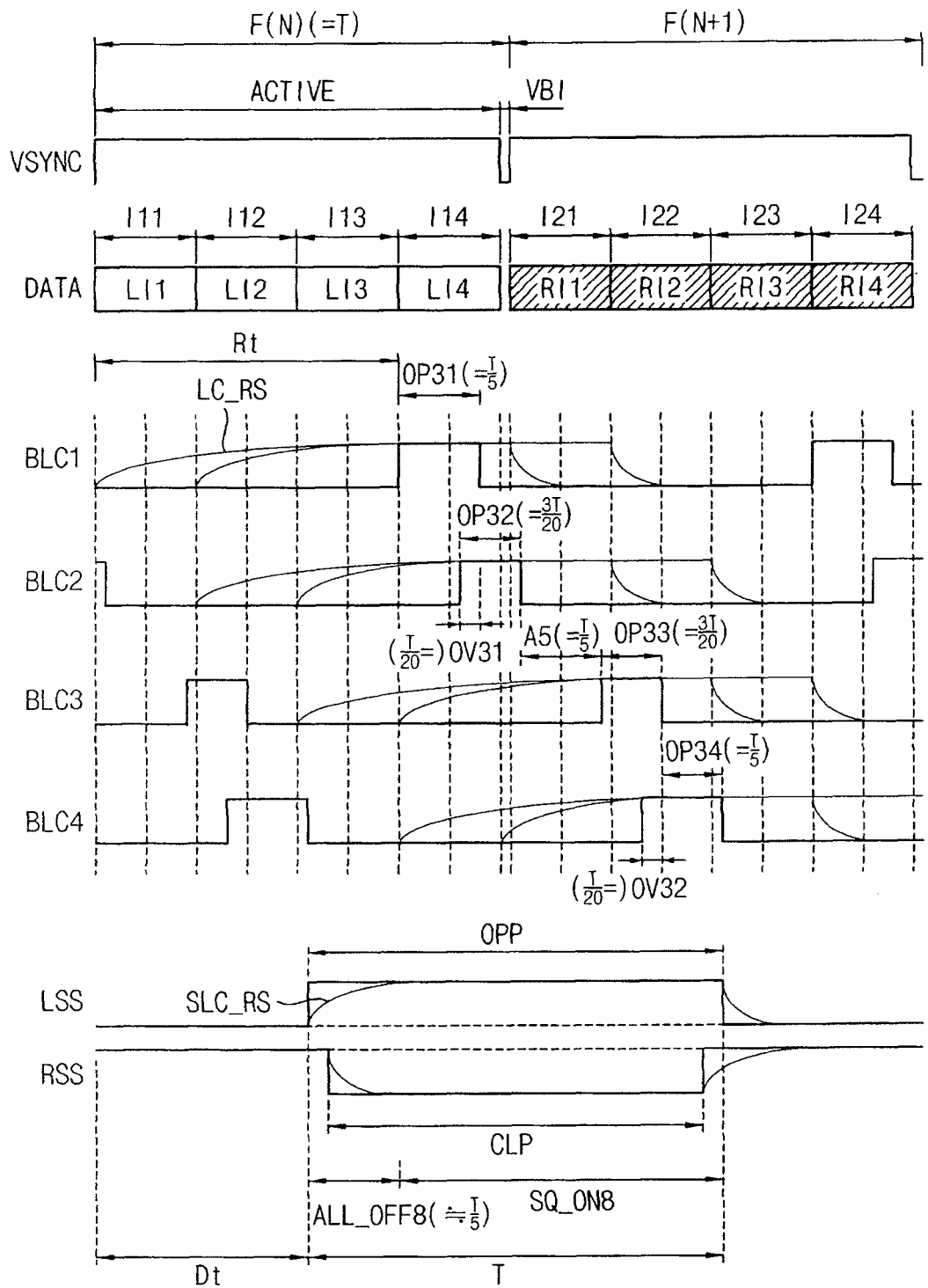
FIG. 21 includes timing diagrams illustrating an example of a method for displaying a stereoscopic image using the display apparatus of FIG. 12.

FIG. 21 is timing diagrams illustrating an example of a method for displaying a stereoscopic image using the display apparatus of FIG. 12.

Referring to FIGS. 12 and 21, the panel driving part 200 outputs left-eye data frames LI1, LI2, LI3 and LI4 to the display panel 100 during an N-th frame F(N), and outputs right-eye data frames RI1, RI2, RI3 and RI4 during an (N+1)-th frame F(N+1), as shown in FIG. 13.

The light source driving part 500 generates first, second, third and fourth light-emitting control signals BLC1, BLC2, BLC3 and BLC4 and drives the light source part 450, for example, the first to fourth light-emitting blocks 450a, 450b, 450c and 450d, respectively.

The first light-emitting block 450a is turned on or turned off in response to the first light-emitting control signal BLC1. The first light-emitting control signal BLC1 has a first light-emitting interval OP31. The first light-emitting interval OP31 is started from an interval in which the set time Rt is elapsed from a start point of an N-th frame F(N) in accordance with a response speed of a liquid crystal of the display panel 100. The set time Rt may be approximately ¾ of the frame period T. The first light-emitting interval OP31 may be approximately ⅕ of the frame period T.

The second light-emitting block 450b is turned on or turned off in response to the second light-emitting control signal BLC2. The second light-emitting control signal BLC2 has a second light-emitting interval OP32. The second light-emitting interval OP32 has a first overlap interval OV31 which at least partially overlaps the first light-emitting interval OP31. The first overlap interval OV31 may be approximately 1/20 of the frame period T. The second light-emitting interval OP32 may be approximately 3/20 of the frame period T.

The third light-emitting block 450c is turned on or turned off in response to the third light-emitting control signal BLC3. The third light-emitting control signal BLC3 has a third light-emitting interval OP33. The third light-emitting interval OP33 is started after the second light-emitting interval OP32 by approximately an interval A5. The interval A5 may be approximately ⅕ of the frame period T. The third light-emitting interval OP33 may be approximately 3/20 of the frame period T.

The fourth light-emitting block 450d is turned on or turned off in response to the fourth light-emitting control signal BLC4. The fourth light-emitting control signal BLC4 has a fourth light-emitting interval OP34. The fourth light-emitting interval OP34 has a second overlap interval OV32 which at least partially overlaps the third light-emitting interval OP33. The second overlap interval OV32 may be approximately 1/20 of the frame period T. The fourth light-emitting interval OP34 may be approximately 1/5 of the frame period T.

The interval A5 may be set in various manners and may depend upon an interval in which the third left-eye block image is maintained on the third display block DB3 in accordance with the response speed of a liquid crystal and the first and second overlap intervals OV11 and OV12.

As shown in FIG. 21, the light source part 450 has a delay difference Dt for a start point of the N-th frame F(N) and repeats an operation in the frame period T. An operation period of the light source part 450 has a sequential on interval SQ_ON8 and an all off interval ALL_OFF8. During the sequential on interval SQ_ON8 corresponding to approximately 4/5 interval, the second light-emitting block 450b at least partially overlaps the first light-emitting block 450a corresponding to the first overlap interval OV31 to sequentially emit light, and the third light-emitting block 450c emits light after the interval A5. The fourth light-emitting block 450d at least partially overlaps the third light-emitting block 340c for the second overlap interval OV32 to sequentially emit light.

During the all off interval ALL_OFF8 corresponding to approximately T/5 interval before the first light-emitting block 450a emits light, the first, second, third and fourth light-emitting blocks 450a, 450b, 450c and 450d are turned off.

Opening and closing operations of the left-eye shutter 610 and the right-eye shutter 620 are activated within the all off interval ALL_OFF8. A liquid crystal margin time may be determined according to a response speed of a liquid crystal SLC_RS of the left-eye shutter 610 and the right-eye shutter 620. The all off interval ALL_OFF8 may be greater than the response speed of a liquid crystal SLC_RS of the shutter glasses 600. The left-eye shutter 610 is fully opened and the right-eye shutter 620 is fully closed within the all off interval ALL_OFF8, so that the left-eye image may be viewed through the shutter glasses 600 in an interval in which the left-eye image is substantially maintained.

Therefore, crosstalk between the left-eye image and the right-eye image due to a response speed of a liquid crystal SLC_RS of the shutter glasses 600 may be reduced or eliminated. Moreover, the interval A4 is extended by using the first and second overlap intervals OV31 and OV32, so that 3D crosstalk may be reduced or eliminated while luminance may be increased and uniformity may be increased by reducing or eliminating leakage light generated at adjacent light-emitting blocks.

In the above exemplary embodiments, it is described that 3D image is divided into a left-eye image and a right-eye image to display the 3D image in a frequency of approximately 120 Hz. Alternatively, the 3D image is divided into a plurality of left-eye images and a plurality of right-eye images to display the 3D images in a frequency of no less than approximately 120 Hz, and, for example, 240 Hz or 480 Hz. Moreover, a black image may be inserted between the left-eye image and the right-eye image so that 3D image may be displayed in a frequency of no less than approximately 120 Hz. The black image may be inserted into at least one frame period. When the 3D image is displayed in a frequency of no less than approximately 120 Hz, each of opening interval and closing interval of a shutter glasses may have a length corresponding to multiple frame periods in which the left-eye images or the right-eye images are displayed.

As described above, according to exemplary embodiments of the present invention, a light source part providing light to a display panel is divided into a plurality of light-emitting blocks so that each left-eye image and each right-eye image are divided according to a time to be viewed, and a light-emitting timing of the light-emitting blocks is controlled so that the left-eye image or the right-eye image is displayed on the display panel. Thus, it may prevent crosstalk from being generated due to a co-existence of the left-eye image and the right-eye image.

Moreover, a 3D stereoscopic image may be realized by using a conventional 120 Hz driving frequency without expanding a vertical blanking interval. Furthermore, a driving margin of a light source part may be secured when the vertical blanking interval is expanded, so that a display quality of the 3D stereoscopic image may be increased.

The foregoing is illustrative of exemplary embodiments of the present invention and is not to be construed as limiting thereof. Although a few exemplary embodiments of the present invention have been described, those skilled in the art will readily appreciate that many modifications are possible in the exemplary embodiments without departing from the present invention.

What is claimed is:

1. A method of displaying a stereoscopic image, the method comprising: outputting a left-eye image to a first display block and a second display block of a display panel during an N-th frame, wherein N is a positive integer; providing light to the first display block during a first period after a first left-eye preset time is elapsed from a time in which corresponding left-eye image is outputted to the first display block; providing light to the second display block during a second period after a second left-eye preset time is elapsed from a time in which corresponding left-eye image is outputted to the second display block, the second period being distinct from the first period; outputting a right-eye image to the first display block and the second display block of the display panel during an M-th frame, wherein M is an integer greater than N; providing light to the first display block during a third period; and providing light to the second display block during a fourth period that is distinct from the third period, wherein the first display block and the second display block occupy distinct regions of the panel, wherein the first and second left-eye preset times are set, based on a response speed of liquid crystal included in the display panel, to have a value greater than a time in which one frame period is divided by a number of light-emitting blocks.

2. The method of claim 1, further comprising: adjusting opening and closing times of a left-eye shutter and a right-eye shutter of a pair of shutter glasses, corresponding to the display of the left-eye image and the right-eye image on each of the display blocks.

3. The method of claim 2, wherein adjusting opening and closing times comprises: opening the left-eye shutter and closing the right-eye shutter while the light is provided to the display blocks displaying the left-eye image; and opening the right-eye shutter and closing the left-eye shutter while the light is provided to the display blocks displaying the right-eye image.

4. The method of claim 1, wherein the left-eye image and the right-eye image are displayed on the display panel at a frame frequency of 60 Hz or a multiple thereof.

5. The method of claim 1, wherein the response speed is a time required by the liquid crystal to achieve a luminance of a first ratio of a luminance when the liquid crystal is saturated, wherein the first ratio is greater than or equal to 60%.

6. The method of claim 1, wherein during both the N-th and M-th frames, light is provided to the first display block for a period of time equal to a period of time for which light is provided to the second display block.

7. The method of claim 1, wherein a left-eye image is outputted during an interval from an (N+1)-th frame that is subsequent to the N-th frame to an (M-1)-th frame that is a previous frame of the M-th frame.

8. The method of claim 7, wherein the left-eye image displayed during an interval from the (N+1)-th frame to the (M-1)-th frame is equal to a left-eye image of the N-th frame or an image generated based on a left-eye image of the M-th frame.

9. The method of claim 7, wherein the left-eye image displayed during an interval from the (N+1)-th frame to the (M-1)-th frame is an image corresponding to a black grayscale value.

10. The method of claim 1, wherein a right-eye image is outputted during an (M+1)-th frame that is subsequent to the M-th frame to an (2M-N-1)-th frame that is a previous frame of the (2M-N)-th frame.

11. The method of claim 10, wherein the right-eye image displayed during an interval from the (M+1)-th frame to the (2M-N-1)-th frame is equal to a right-eye image of the M-th frame or an image generated based on a right-eye image of the M-th frame.

12. The method of claim 10, wherein the right-eye image displayed during an interval from the (M+1)-th frame to the (2M-N-1)-th frame is an image corresponding to a black grayscale value.

13. A display apparatus comprising: a light source part comprising k light-emitting blocks outputting light, wherein k is a positive integer; a display panel which is divided into k display blocks corresponding to the k light-emitting blocks and alternately displaying a left-eye image and a right-eye image, wherein k is an integer greater than or equal to two; a panel driving part which is configured to output a left-eye image to the display panel divided into k display blocks during an N-th frame, wherein N is positive integer; and a light source driving part configured to provide light to each of the display blocks at a time that first to k-th left-eye preset times respectively corresponding to the k display blocks are elapsed from a time in which corresponding left-eye images are outputted to each of the display blocks, wherein the panel driving part is additionally configured to output a right-eye image to the display panel during an M-th frame, wherein M is an integer greater than N, wherein the light source driving part is additionally configured to provide light to each of the display blocks at a time that first to k-th right-eye preset times respectively corresponding to the k display blocks are elapsed from a time in which corresponding right-eye images are outputted to each of the display blocks, and wherein each of the first to k-th left-eye preset times and each of the first to k-th right-eye preset times is set, based on a response speed of liquid crystal included in the display panel, to have a value greater than a time in which one frame period is divided by a number of the k light-emitting blocks.

14. The display apparatus of claim 13, further comprising a shutter glasses comprising a left-eye shutter and a right-eye shutter, wherein the shutter glasses selectively open and close the left-eye shutter and the right-eye shutter in accordance with an image displayed on the display panel.

15. The display apparatus of claim 14, wherein the shutter glasses open the left-eye shutter and close the right-eye shutter, while the light are provided to the k display blocks on which the left-eye image is displayed, and open the right-eye shutter and close the left-eye shutter, while the light is provided to the k display blocks on which the right-eye image is displayed.

16. The display apparatus of claim 14, wherein the display panel displays the left-eye image and the right-eye image at a frame frequency of 60 Hz or a multiple thereof.

17. The display apparatus of claim 14, further comprising: a timing control part controlling driving timings of the k light-emitting blocks and the shutter glasses based on the left-eye image and the right-eye linage that are displayed on the display panel.

18. The display apparatus of claim 14, wherein the light source driving part sets a time required for providing each of the display blocks with light, which is smaller than or equal to a time that the first to k-th left-eye preset times are subtracted from a period of the N-th frame.

19. The display apparatus of claim 14, wherein the light source driving part sets a time required for providing each of the display blocks with light, which is smaller than or equal to a time that the first to k-th right-eye preset times are subtracted from a period of the M-th frame.

20. The display apparatus of claim 14, further comprising a light-blocking member disposed between adjacent light-emitting blocks to reduce or block light leaked beyond a corresponding light-emitting block.

21. The display apparatus of claim 15, wherein each of the k light-emitting blocks comprises at least one light source, and the light source is a line light source or a point light source.

22. The display apparatus of claim 21, wherein the light source part is disposed at a side of the display panel.

23. The display apparatus of claim 21, wherein the light source part is disposed below the display panel.

24. A display apparatus comprising: a light source part comprising k light-emitting blocks outputting light, wherein k is a positive integer; a display panel which is divided into k display blocks corresponding to the k light-emitting blocks and alternately displaying a left-eye image and a right-eye image, wherein k is an integer greater than or equal to two; a panel driving part which is configured to output a left-eye image to the display panel divided into k display blocks during an N-th frame, wherein N is a positive integer; and a light source driving part configured to provide light to each of the display blocks at a time that first to k-th left eye preset times respectively corresponding to the k display blocks are elapsed from a time in which corresponding left-eye images are outputted to each of the display blocks, wherein the panel driving part is additionally configured to output a right-eye image to the display panel during an M-th frame, wherein M is an integer greater than N, wherein the light source driving part is additionally configured to provide light to each of the display blocks at a time that first to k-th right-eye preset times respectively corresponding to the k display blocks are elapsed from a time in which corresponding right-eye images are outputted to each of the display blocks, the display apparatus further comprising a shutter glasses comprising a left-eye shutter and a right-eye shutter, wherein the shutter glasses selectively open and close the left-eye shutter and the right-eye shutter in accordance with an image displayed on the display panel, wherein each of the first to k-th left-eye preset times and each of the first to k-th right-eye preset times is set based on a response speed of a liquid crystal included in the display panel, to have a value greater than a time in which one frame period is divided by a number of the k light-emitting blocks.

25. A method of displaying a stereoscopic image, the method comprising: outputting data corresponding to a left-eye image or a right-eye image to a display panel in which first to k-th display blocks are defined by first to k-th light-emitting blocks arranged along a scan direction, wherein k is a positive integer; turning off the first to k-th light-emitting blocks during an all-off interval of one frame period; sequentially turning on the first to k-th light-emitting blocks during a sequential-on interval after the all off interval of the frame period; and starting an opening and closing operation of a left-eye shutter and a right-eye shutter included in a shutter glasses corresponding to the left-eye image and the right-eye image displayed on the display panel within the all off interval, wherein a first light-emitting block of the first to k-th light-emitting blocks emits light during a first light-emitting interval after a predetermined set time from a time that a first line data of a first display block is outputted, wherein the predetermined set time is set based on a response speed of liquid crystal included in the display panel, the response speed being a time required by the liquid crystal to achieve a first ratio of a luminance when the liquid crystal is saturated, and wherein in sequentially turning on the first to k-th light-emitting blocks, at least one of the first to k-th light-emitting blocks has light-emitting intervals of a different length than at least one other of the first to k-th light emitting blocks.

26. The method of claim 25, wherein in sequentially turning on the first to k-th light-emitting blocks, at least one of the first to k-th light-emitting blocks has an overlap interval at least partially overlapping a light-emitting interval of a previous light-emitting block.

27. The method of claim 26, wherein all of the light-emitting intervals have respective overlap intervals having the same length.

28. The method of claim 25, wherein in sequentially turning on the first to k-th light-emitting blocks, at least one of the first to k-th light-emitting blocks has a sequential-on interval spaced from a sequential-on interval of a previous light-emitting block by a predetermined interval.

29. The method of claim 28, wherein the predetermined intervals of the at least one of the first to k-th light emitting blocks of the sequential on interval all have the same length.

30. The method of claim 25, wherein the predetermined intervals of the at least one of the first to k-th light emitting blocks of the sequential on interval have the different lengths.

31. The method of claim 25, wherein the all off interval is greater than a response speed of a liquid crystal of the shutter glasses.

32. The method of claim 31, wherein starting opening and closing operation of a left-eye shutter and a right-eye shutter comprises: opening one of the left-eye shutter and the right-eye shutter corresponding to an image displayed on the display panel; and closing another of the left-eye shutter and the right-eye shutter.

33. The method of claim 32, wherein an off interval within which the shutter of the shutter glasses is closed is longer than a closing interval within which the shutter of the shutter glasses is closed.

34. A method of displaying a stereoscopic image, the method comprising: outputting data corresponding to a left-eye image or a right-eye image to a display panel in which first to k-th display blocks are defined by first to k-th light-emitting blocks arranged along a scan direction, wherein k is a positive integer; turning off the first to k-th light-emitting blocks during an all-off interval of one frame period; sequentially turning on the first to k-th light-emitting blocks during a sequential-on interval after the all off interval of the frame period; and starting an opening and closing operation of a left-eye shutter and a right-eye shutter included in a shutter glasses corresponding to the left-eye image and the right-eye image displayed on the display panel within the all off interval, wherein each of the sequential-on interval for the first to k-th light emitting blocks overlaps an adjacent sequential-on interval of the sequential-on interval for the first to k-th light emitting blocks by a different length.

35. A method of displaying a stereoscopic image, the method comprising: outputting data corresponding to a left-eye image or a right-eye image to a display panel in which first to k-th display blocks are defined by first to k-th light-emitting blocks arranged along a scan direction, wherein k is a positive integer; turning off the first to k-th light-emitting blocks during an all-off interval of one frame period; sequentially turning on the first to k-th light-emitting blocks during a sequential-on interval after the all off interval of the frame period; and starting an opening and dosing operation of a left-eye shutter and a right-eye shutter included in a shutter glasses corresponding to the left-eye image and the right-eye image displayed on the display panel within the all off interval, wherein a first light-emitting block of the first to k-th light-emitting blocks emits light during a first light-emitting interval after a predetermined set time from a time that a first line data of a first display block is outputted, and wherein the predetermined set time is equal to a time required for applying a first line data of a first display block through applying a last line data of an (k-1)-th display block.

* * * * *